(12) United States Patent
Ori

(10) Patent No.: US 8,699,147 B2
(45) Date of Patent: Apr. 15, 2014

(54) ZOOM LENS

(71) Applicant: FUJIFILM Corporation, Tokyo (JP)

(72) Inventor: Tetsuya Ori, Saitama-ken (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 13/894,483

(22) Filed: May 15, 2013

(65) Prior Publication Data

US 2013/0250436 A1  Sep. 26, 2013

Related U.S. Application Data

(63) Continuation of application No. PCT/JP2011/006139, filed on Nov. 2, 2011.

(30) Foreign Application Priority Data

Nov. 18, 2010 (JP) .................................. 2010-257789

(51) Int. Cl.
*G02B 15/177* (2006.01)

(52) U.S. Cl.
USPC ......................................................... 359/689

(58) Field of Classification Search
USPC .................................................. 359/689, 784
See application file for complete search history.

(56) References Cited

U.S. PATENT DOCUMENTS

| | | | |
|---|---|---|---|
| 6,452,729 B2 * | 9/2002 | Yamamoto | ..................... 359/676 |
| 6,614,599 B1 | 9/2003 | Watanabe | |
| 6,618,210 B2 | 9/2003 | Noguchi et al. | |
| 2004/0095654 A1 | 5/2004 | Watanabe | |
| 2007/0070495 A1 | 3/2007 | Hirose | |

FOREIGN PATENT DOCUMENTS

| | | |
|---|---|---|
| JP | 2001-141997 | 5/2001 |
| JP | 2002-072091 | 3/2002 |
| JP | 2002-072093 | 3/2002 |
| JP | 2003-307677 | 10/2003 |
| JP | 2007-114727 | 5/2007 |

OTHER PUBLICATIONS

International Search Report PCT/JP2011/006139 dated Dec. 13, 2011, with English Translation.

* cited by examiner

*Primary Examiner* — Joseph P Martinez
(74) *Attorney, Agent, or Firm* — Young & Thompson

(57) ABSTRACT

A zoom lens includes a first lens group having a negative power, a second lens group having a positive power, and a third lens group having a positive power arranged in this order from an object side and an aperture stop which is moved integrally with the second lens group, and performs zooming by changing a distance between the first and second lens groups and a distance between the second and third lens groups, wherein the second lens group is composed of a second group first lens having a positive power with a convex surface facing the object side, a cemented lens having a positive power as a whole, and a second group fourth lens having a negative power and at least one aspheric surface with a concave surface facing the image side arranged in this order from the object side.

20 Claims, 18 Drawing Sheets

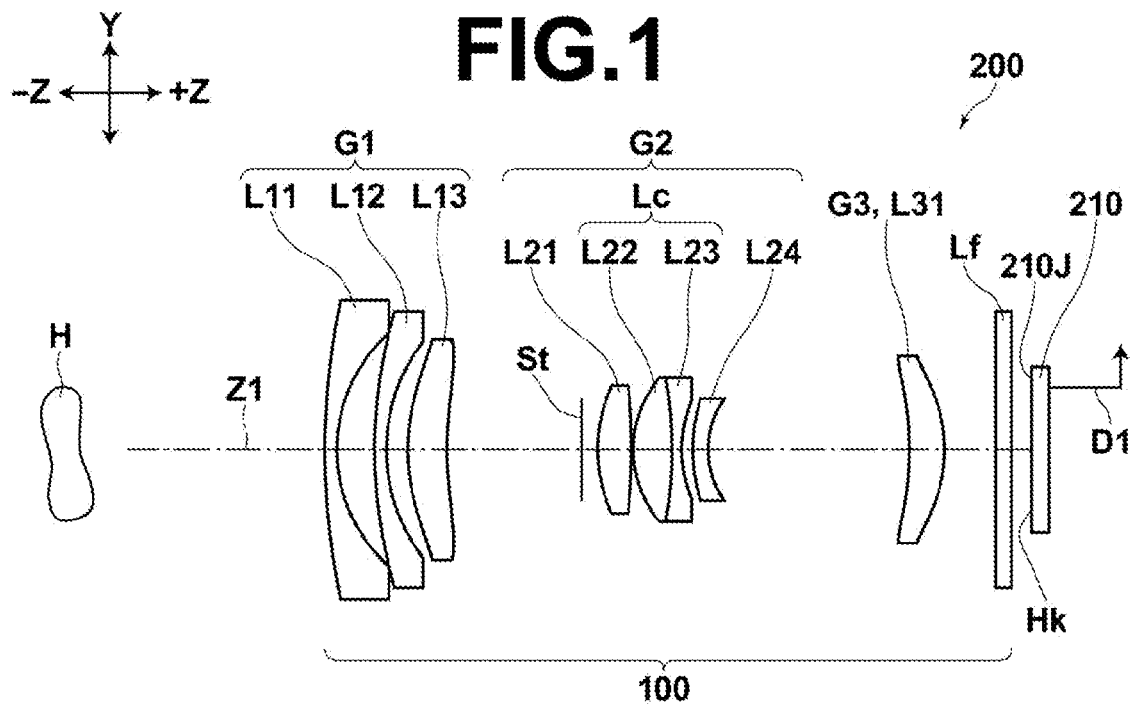
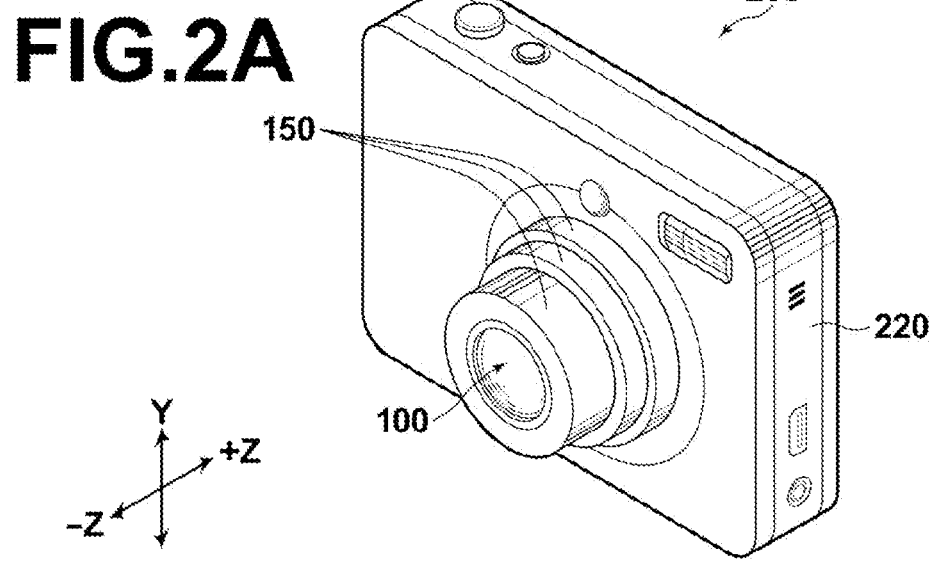

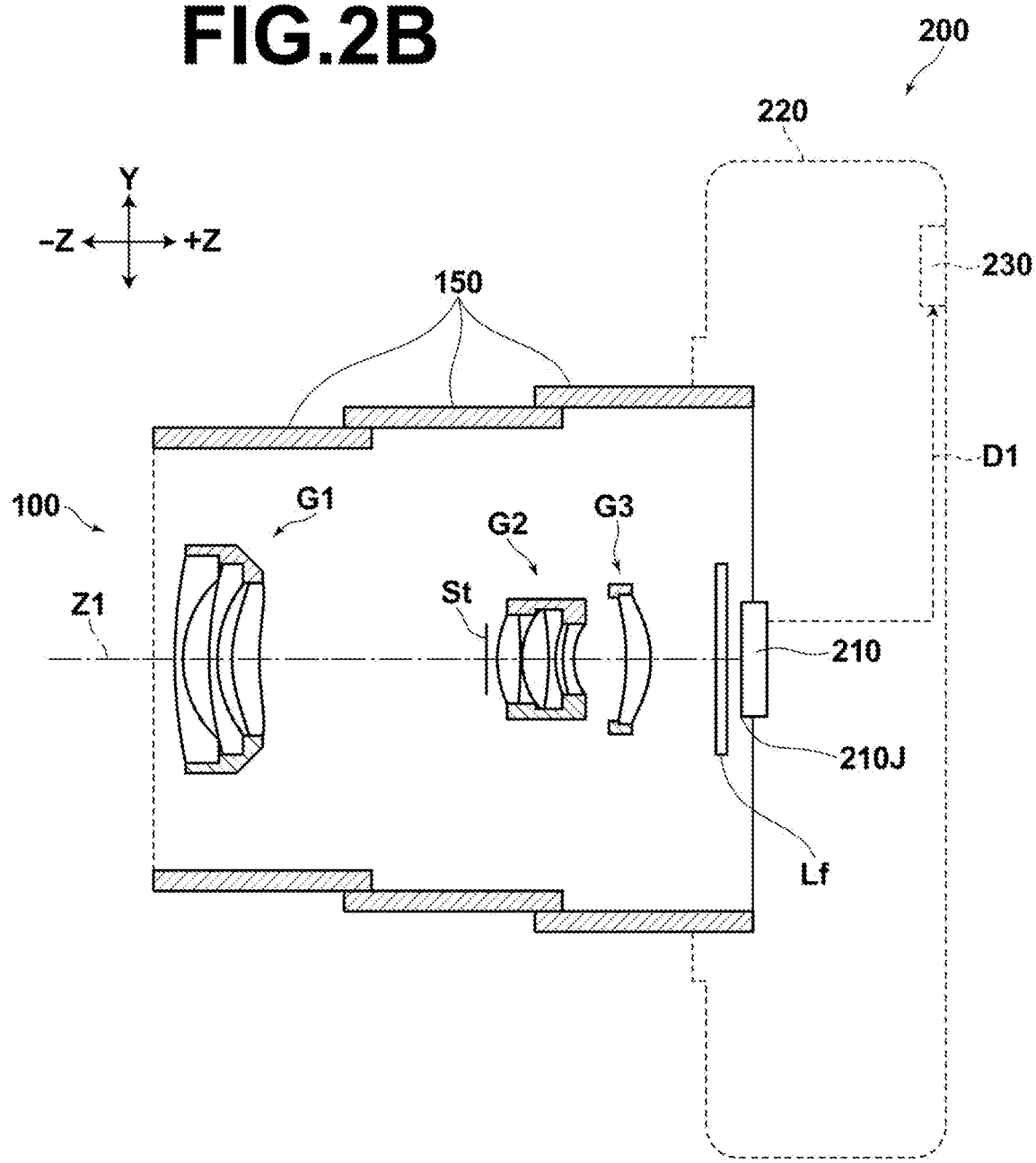

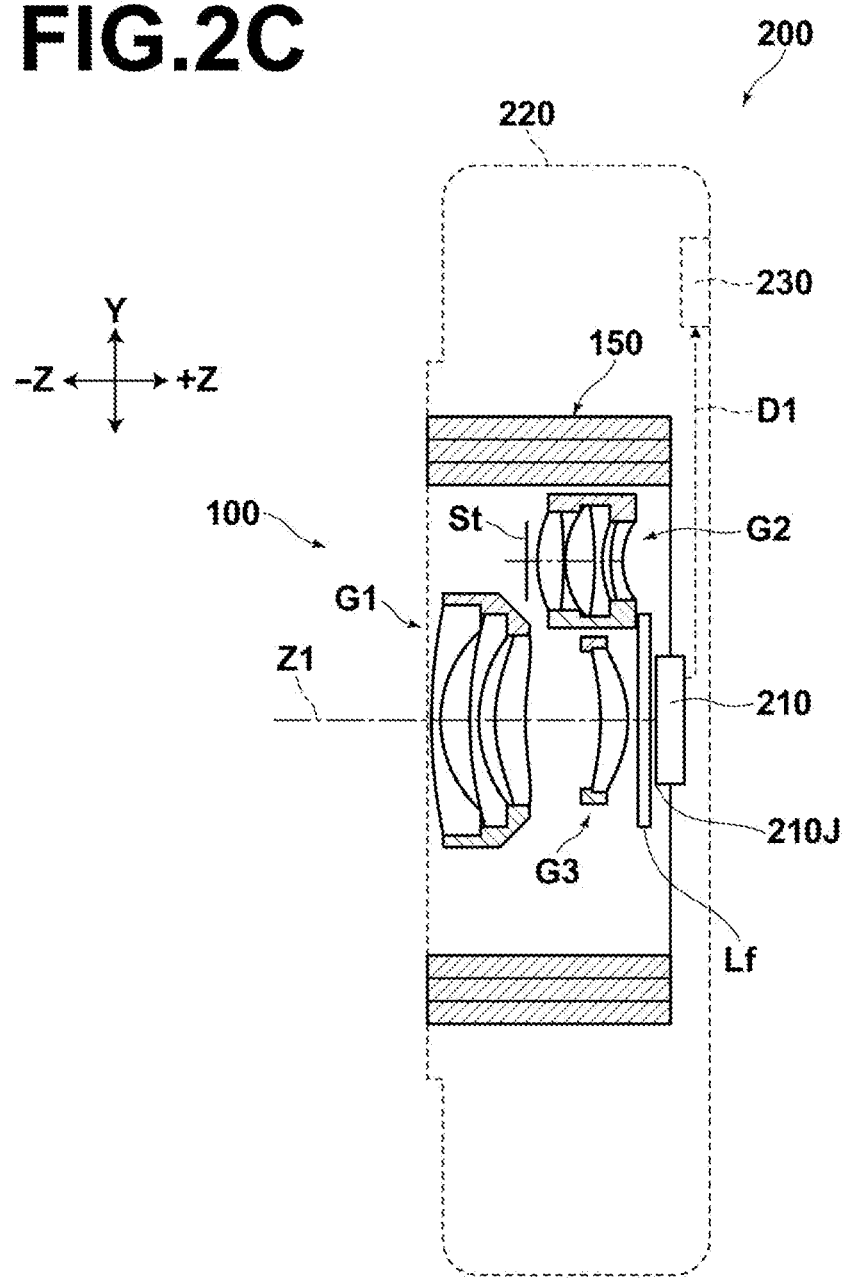

COMMON TO EXAMPLES 1 TO 7
WIDE ANGLE END

ZOOM LENS

TECHNICAL FIELD

The present invention relates to a zoom lens and more specifically to a three-group zoom lens.

BACKGROUND ART

Heretofore, in image pickup optical systems of digital cameras and the like required to be compact and have a high zoom ratio, a four-group zoom lens having a relatively high zoom ratio of about 5× has been known.

Further, despite having a zoom ratio of about 3×, a three-group zoom lens with an intention to further reduce the size by reducing the number of lenses has also been known as described, for example, in U.S. Pat. Nos. 6,452,729, 6,618,210, and Japanese Unexamined Patent Publication No. 2003-307677.

DISCLOSURE OF THE INVENTION

The zoom lens described in U.S. Pat. No. 6,452,729 includes a first lens group having a negative power (hereinafter, also referred to as the "negative first lens group" for short), a positive second lens group, and a positive third lens group. The first lens group includes a lens having a negative power (hereinafter, also referred to as the "negative lens"), a negative lens, and a positive lens arranged in this order from the object side, the second lens group includes a positive lens, a positive lens, a negative lens, and a positive lens arranged in this order from the object side, and the third lens group includes a positive lens. This zoom lens has a problem that the second lens group has a large outer diameter because the positive lenses on the object side in the second zoom lens are formed to have a weak power since the lens on the most image side in the second lens group is a positive lens and effective diameters of the positive lenses on the object side need to be increased.

The zoom lens described in U.S. Pat. No. 6,618,210 includes a negative first lens group, a positive second lens group, and a positive third lens group. The first lens group includes a negative lens, a negative lens, and a positive lens arranged in this order from the object side, the second lens group includes a positive lens, a positive lens, a negative lens, and a negative lens arranged in this order from the object side, and the third lens group includes a positive lens. The zoom lens in which the lens on the most image side is a negative lens in the second lens group as described above has a problem that it is difficult to control aberrations over the entire zoom range when the zoom ratio is increased to 5× because the power of the first lens group is increased.

The zoom lens described in Japanese Unexamined Patent Publication No. 2003-307677 includes a negative first lens group, a positive second lens group, and a positive third lens group. The first lens group includes a negative lens, a negative lens, and a positive lens in this order from the object side, the second lens group includes a positive lens, a positive lens, a negative lens, and a positive lens in this order from the object side, and the third lens group includes a positive lens. This zoom lens has a problem that the second lens group has a large outer diameter because the positive lenses on the object side in the second zoom lens are formed to have a weak power since the lens on the most image side in the second lens group is a positive lens and effective diameters of the positive lenses on the object side need to be increased, as in the zoom lens described in U.S. Pat. No. 6,452,729.

Under the circumstances described above, there is a demand, in three-group zoom lenses with a zoom ratio of about 5×, that both the prevention of aberrations over the entire zoom range and prevention of increase in the outer diameter of the second lens group be satisfied.

The present invention has been developed in view of the circumstances described above, and it is an object of the present invention to provide a three-group zoom lens which is compact, yet capable of preventing aberrations over the entire zoom range.

A zoom lens of the present invention is a zoom lens substantially consisting of a first lens group having a negative power, a second lens group having a positive power, and a third lens group having a positive power arranged in this order from an object side and an aperture stop which is moved integrally with the second lens group, and performing zooming by changing a distance between the first and second lens groups and a distance between the second and third lens groups, wherein:

the first lens group is composed of a first group first lens having a negative power with a concave surface facing an image side, a first group second lens having a negative power with a concave surface facing the image side, and a first group third lens having a positive power and at least one aspheric surface with a convex surface facing the object side arranged in this order from the object side;

the second lens group is composed of a second group first lens having a positive power with a convex surface facing the object side, a cemented lens having a positive power as a whole, and a second group fourth lens having a negative power and at least one aspheric surface with a concave surface facing the image side arranged in this order from the object side, wherein the cemented lens is composed of a second group second lens having a positive power with a convex surface facing the object side and a second group third lens having a negative power with a concave surface facing the image side arranged in this order from the object side; and the third lens group is composed of a third group first lens having a positive power.

Preferably, both the first group third lens and the second group fourth lens are plastic lenses and the zoom lens satisfies a conditional expression (1): $-0.2 < fw/f13 + fw/f24 < 0.2$, where: fw is a focal length of the entire zoom lens system at a wide angle end; f13 is a focal length of the first group third lens; and f24 is a focal length of the second group fourth lens.

Preferably, the third group first lens is a plastic lens having at least one aspheric surface.

Preferably, the zoom lens satisfies a conditional expression (2): $0 < fw/f13 + fw/f24 + fw/f31 < 0.4$, where f31 is a focal length of the third group first lens.

Preferably, the zoom lens satisfies a conditional expression (3): $-3.0 < f1/fw < -2.3$, where f1 is a focal length of the first lens group.

Preferably, the zoom lens satisfies a conditional expression (4): $1.8 < LT/(fw \times U \times \tan \Omega) < 2.3$, where: LT is an overall optical length;

U is a zoom ratio; and ω is a half angle of view at a maximum image height at the wide angle end.

The zoom lens may perform focusing by moving the third lens group.

The second group fourth lens may have an aspheric surface only on an object side lens surface, only on an image side lens surface, or on each lens surface.

Preferably, the zoom lens has a zoom ratio greater than 4× and less than 6×.

An image pickup apparatus of the present invention is an image pickup apparatus, including the zoom lens described above and an image sensor for capturing an optical image formed by the zoom lens.

A distinction is made between positive and negative for the focal length of each lens and focal length of a plurality of combined lenses (combined focal length) in which a focal length of a lens is determined to be positive if the focal point is located on the exit side of the lens when a light beam is passed through the lens and negative if it is located on the incident side of the lens.

The sign of a radius of curvature of a lens is positive if it is convex to the object side and negative if it is convex to the image side.

In the case where a lens surface is aspheric, the concavity or convexity, positive or negative for the refractive power, radius of curvature, and the like, of the lens surface are defined in the paraxial region.

The overall optical length LT is a distance on the optical axis from the object side lens surface of the first group first lens when the zoom is set to the telephoto end to the imaging surface when a subject in infinity is formed thereon through the zoom lens. Note that the distance described above is an actual distance (real distance), including a back focus, and not an air equivalent value.

According to the zoom lens of the present invention, a first lens group having a negative power, a second lens group having a positive power, and a third lens group having a positive power are arranged in this order from an object side and an aperture stop which is moved integrally with the second lens group is provided, and zooming is performed by changing a distance between the first and second lens groups and a distance between the second and third lens groups. Here, the first lens group is composed of a first group first lens having a negative power with a concave surface facing an image side, a first group second lens having a negative power with a concave surface facing the image side, and a first group third lens having a positive power and at least one aspheric surface with a convex surface facing the object side arranged in this order from the object side, the second lens group is composed of a second group first lens having a positive power with a convex surface facing the object side, a cemented lens having a positive power as a whole, and a second group fourth lens having a negative power and at least one aspheric surface with a concave surface facing the image side arranged in this order from the object side, in which the cemented lens is composed of a second group second lens having a positive power with a convex surface facing the object side and a second group third lens having a negative power with a concave surface facing the image side arranged in this order from the object side, and the third lens group is composed of a third group first lens having a positive power. This allows downsizing of the zoom lens while preventing aberrations over the entire zoom range.

That is, as the lens on the most image side in the second group is a negative lens, the positive lenses on the object side in the second lens group may be formed to have a strong refractive power. This allows effective diameters of the lenses in the second lens group to be reduced so that the outer diameter of the entire second lens group may be reduced. Further, as the lens on the most image side in the second lens group has at least one aspheric surface, aberrations may be prevented more reliably over the entire zoom range.

Further, if the zoom lens of the present invention is constructed so as to be retracted inside of an image pickup apparatus by moving the second lens group of the zoom lens in a direction orthogonal to the optical axis and moving the entire zoom lens in an optical direction, the thickness of the zoom lens, when retracted, in the optical axis direction may be reduced.

That is, for example, more and more recent digital cameras employ a retraction method, when retracting a zoom lens inside of an image pickup apparatus, in which the entire zoom lens is retracted inside of the image pickup apparatus by shifting a particular lens group in a direction perpendicular to the optical axis and moving each lens group in the optical axis direction. In that case, each lens group is moved in the optical axis direction and retracted such that the lens group shifted in a direction orthogonal to the optical axis and other lens groups are not overlapped in the optical axis direction. Here, it is demanded that the thickness of the entire zoom lens in the optical axis direction, when it is retracted, be reduced and the outer diameter of the lens barrel, when the entire zoom lens is retracted inside of the image pickup apparatus, be reduced by reducing the outer diameter of the lens group to be shifted in a direction orthogonal to the optical axis.

According to the structure of the zoom lens of the present invention described above, the use of a negative lens as the lens disposed on the most image side in the second lens group allows the outer diameter of the second lens group which is smaller than the other lens groups (first and third lens groups) due to being positioned near the aperture stop to be further reduced. Thus, if an arrangement is adopted in which the entire zoom lens is retracted by moving the second lens group in a direction orthogonal to the optical axis and moving the entire zoom lens in the optical axis direction, the thickness of the entire zoom lens in the optical axis direction and the outer diameter thereof, when it is retracted, may be reduced, as described above. Therefore, the space required to retract the entire zoom lens inside of the image pickup apparatus may be reduced.

BRIEF DESCRIPTION OF DRAWINGS

FIG. 1 is a cross-sectional view of a zoom lens and an image pickup apparatus according to an embodiment of the present invention, illustrating a schematic configuration thereof.

FIG. 2A is a perspective view of the image pickup apparatus equipped with the zoom lens, illustrating an overall view thereof.

FIG. 2B illustrates the state of the zoom lens before being retracted.

FIG. 2C illustrates the state of the zoom lens after being retracted.

BEST MODE FOR CARRYING OUT THE INVENTION

Figure 3:
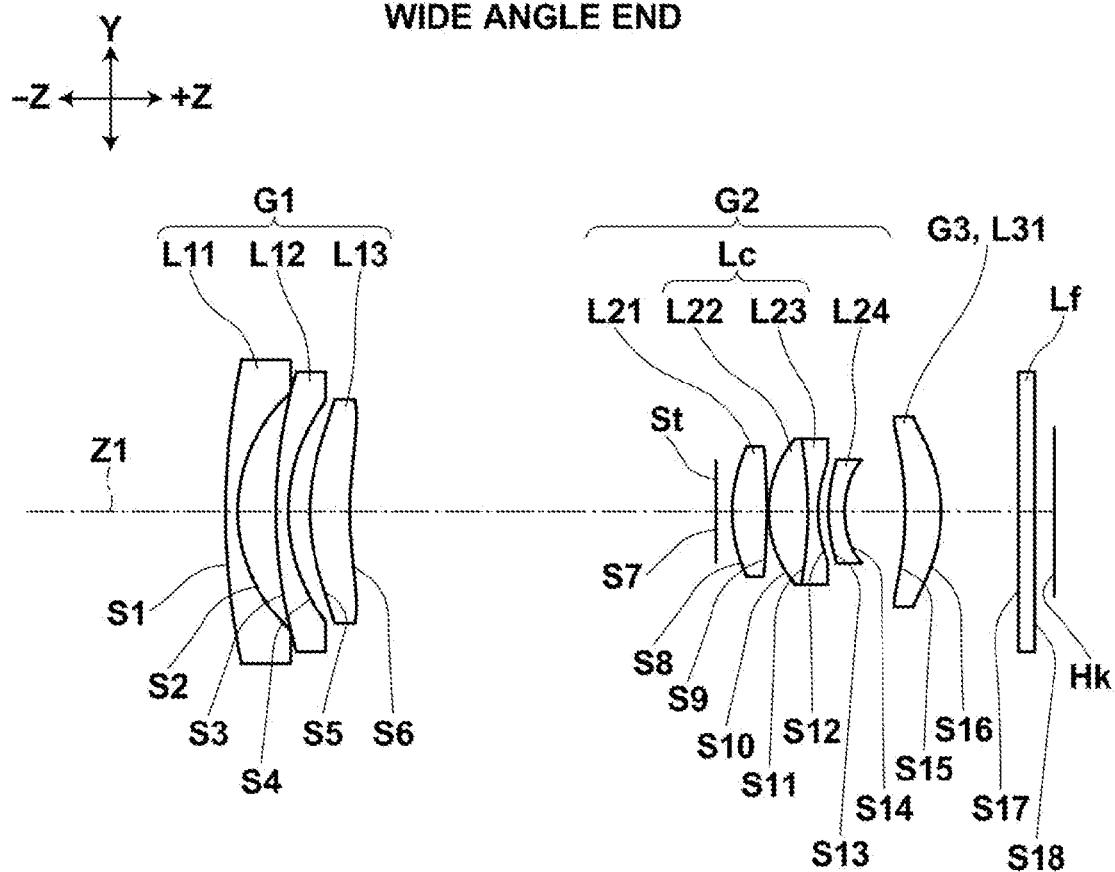
FIG. 3 is a cross-sectional view, commonly illustrating a schematic configuration of zoom lenses of Examples 1 to 7 when the zoom is set to a wide angle end.
Figure 4:
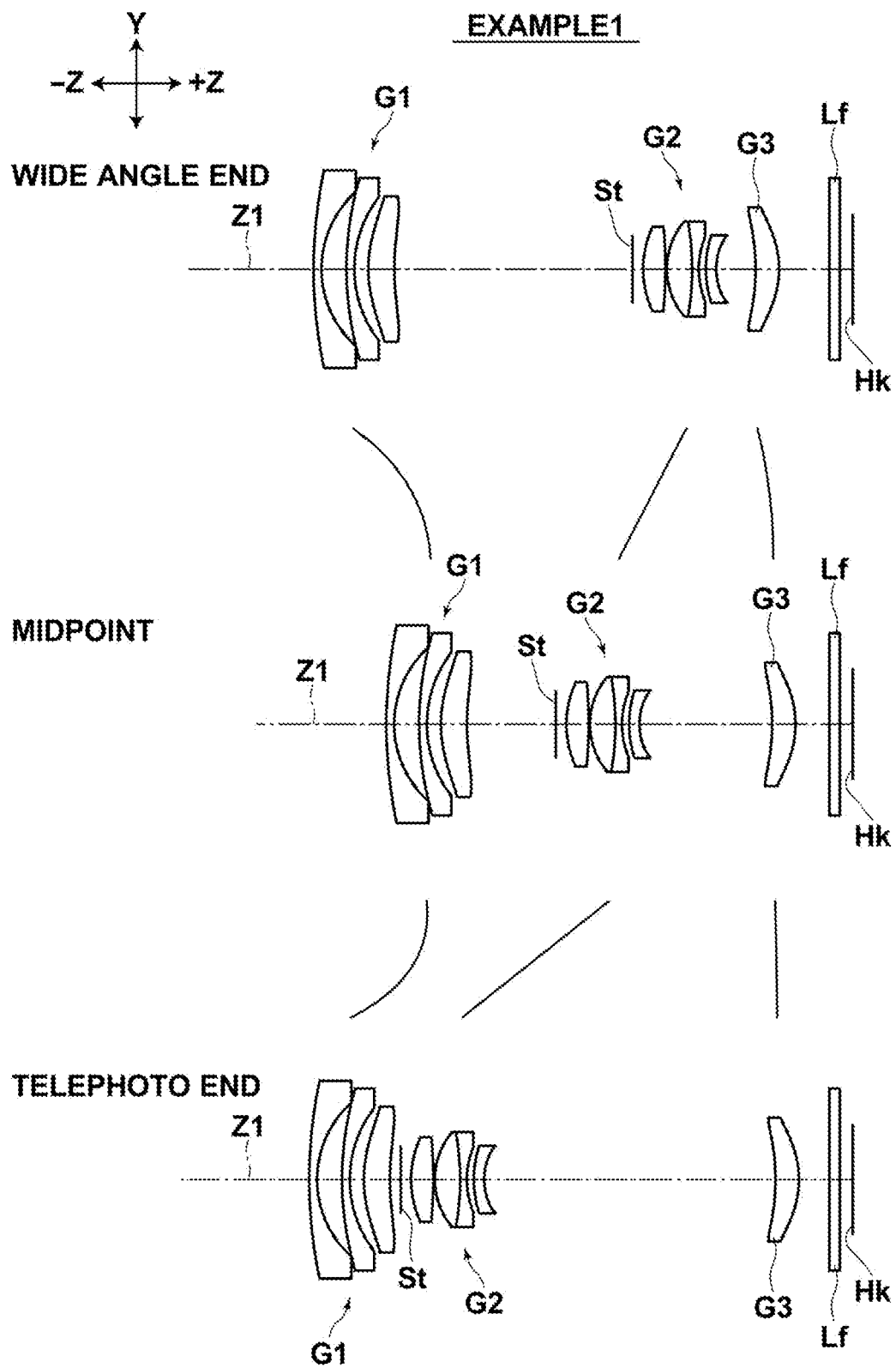
FIG. 4 is a cross-sectional view of a zoom lens of Example 1, comparatively illustrating the states in which the zoom is set to a wide angle end, a midpoint, and a telephoto end.
Figure 5:
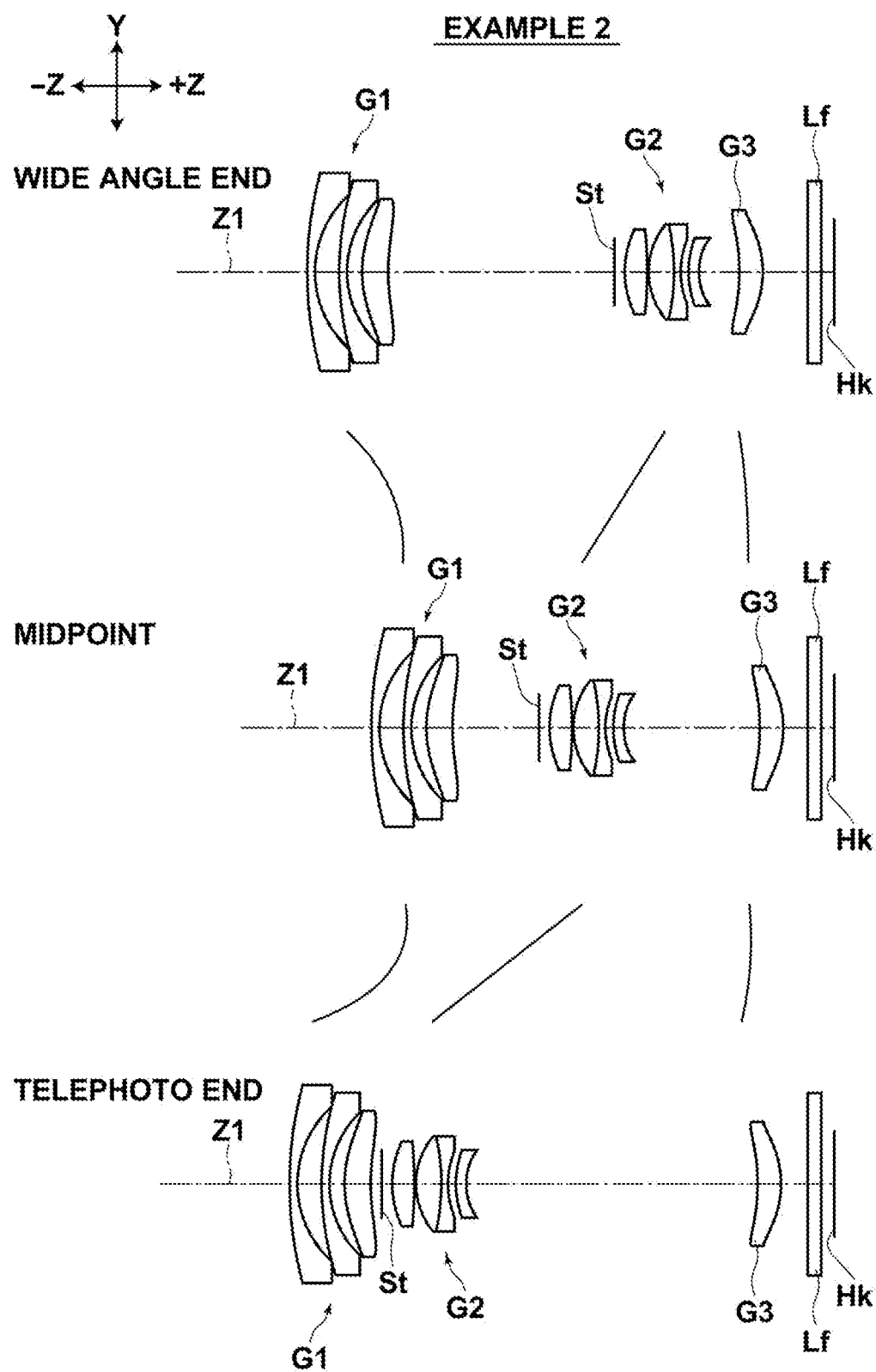
FIG. 5 is a cross-sectional view of a zoom lens of Example 2, comparatively illustrating the states in which the zoom is set to a wide angle end, a midpoint, and a telephoto end.
Figure 6:
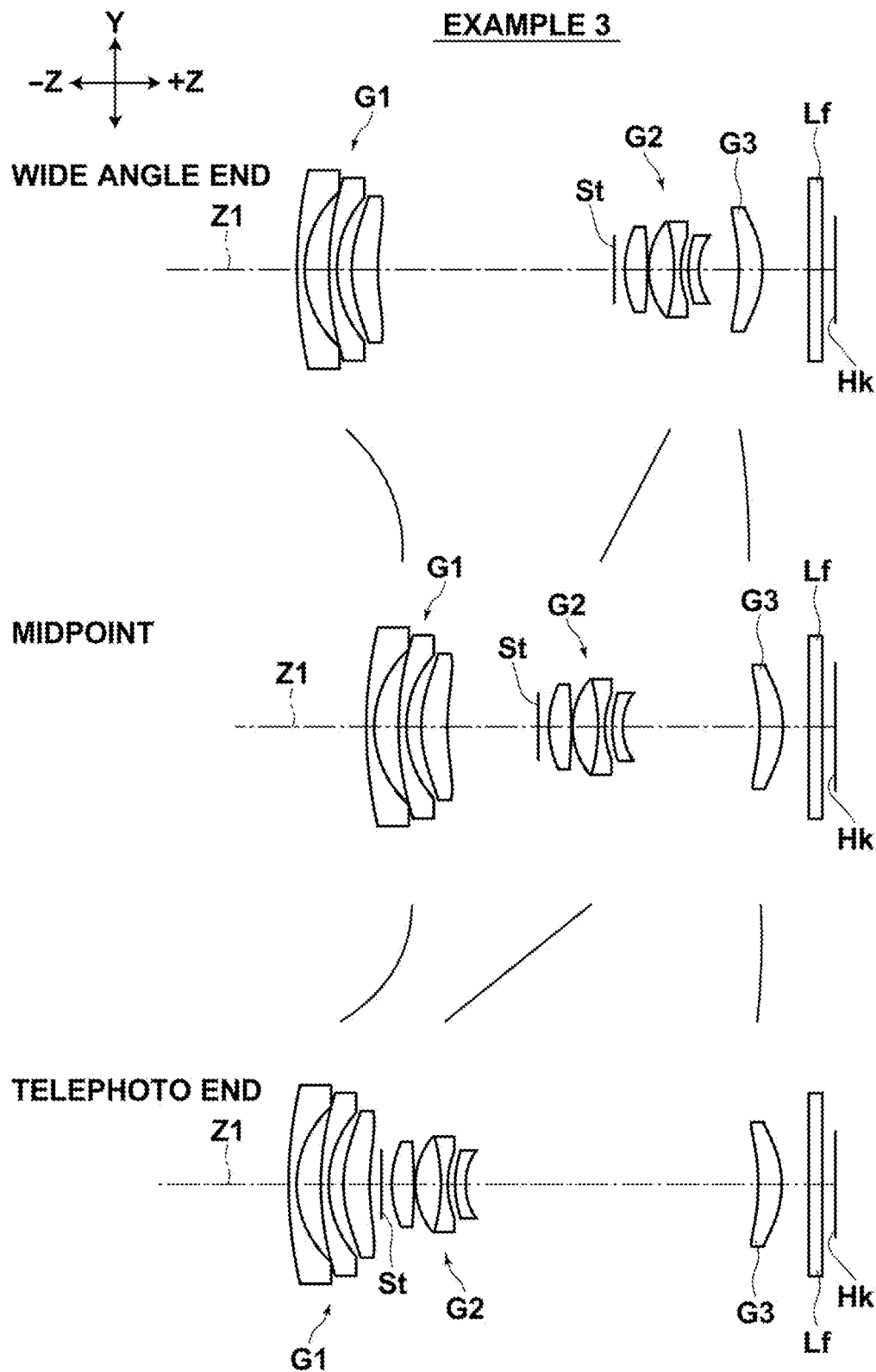
FIG. 6 is a cross-sectional view of a zoom lens of Example 3, comparatively illustrating the states in which the zoom is set to a wide angle end, a midpoint, and a telephoto end.
Figure 7:
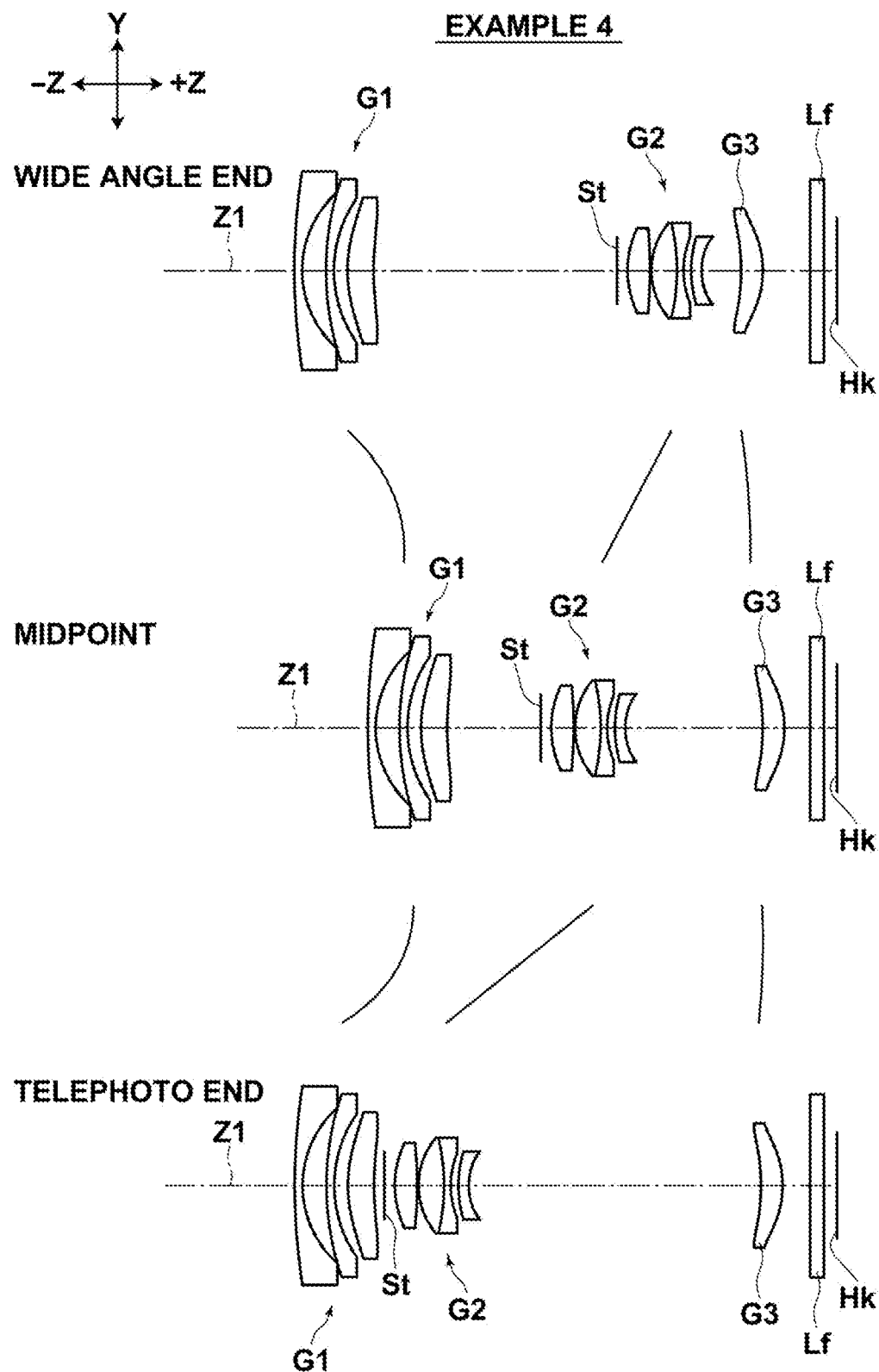
FIG. 7 is a cross-sectional view of a zoom lens of Example 4, comparatively illustrating the states in which the zoom is set to a wide angle end, a midpoint, and a telephoto end.
Figure 8:
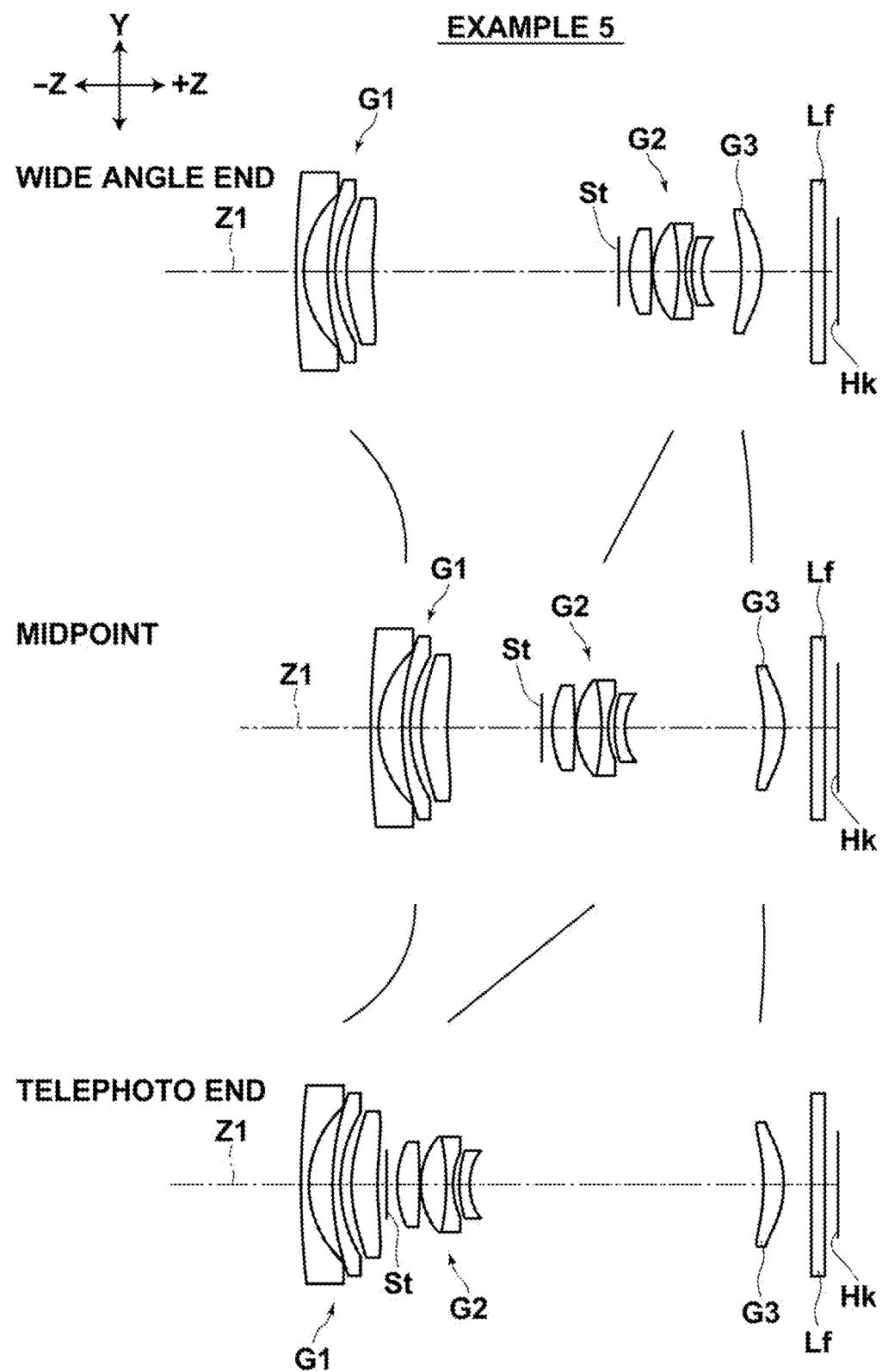
FIG. 8 is a cross-sectional view of a zoom lens of Example 5, comparatively illustrating the states in which the zoom is set to a wide angle end, a midpoint, and a telephoto end.
Figure 9:
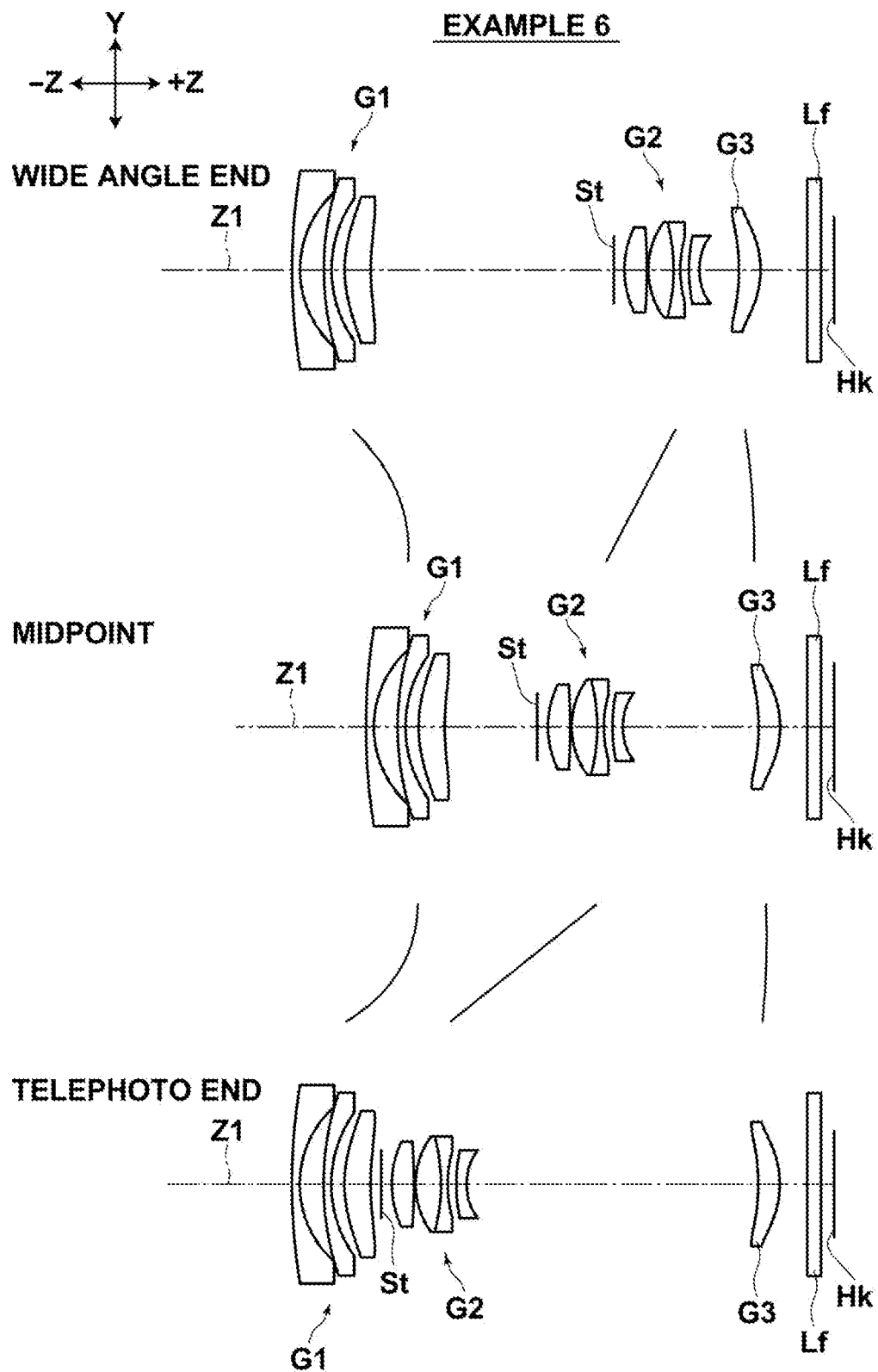
FIG. 9 is a cross-sectional view of a zoom lens of Example 6, comparatively illustrating the states in which the zoom is set to a wide angle end, a midpoint, and a telephoto end.
Figure 10:
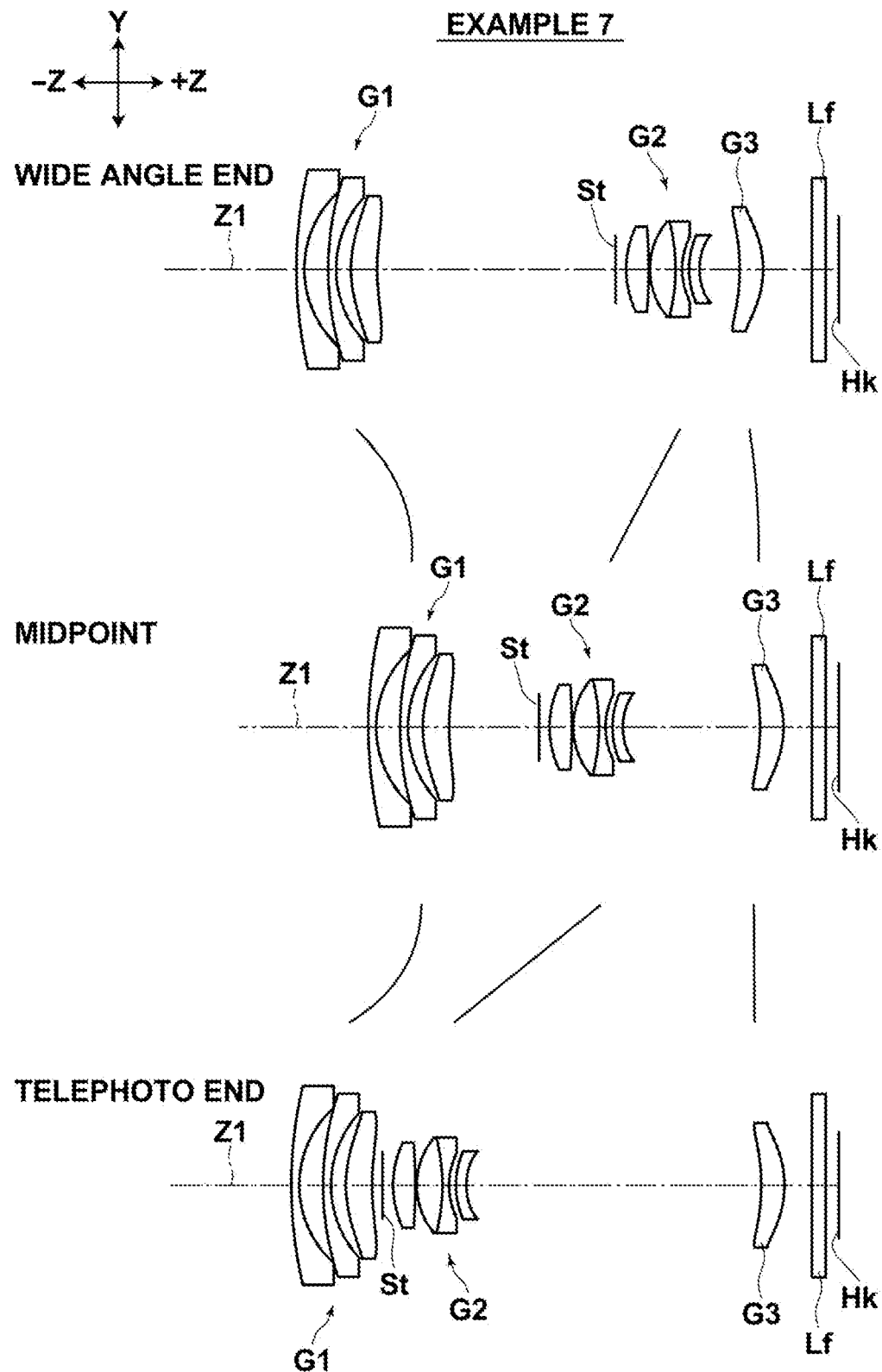
FIG. 10 is a cross-sectional view of a zoom lens of Example 7, comparatively illustrating the states in which the zoom is set to a wide angle end, a midpoint, and a telephoto end.
Figure 11:
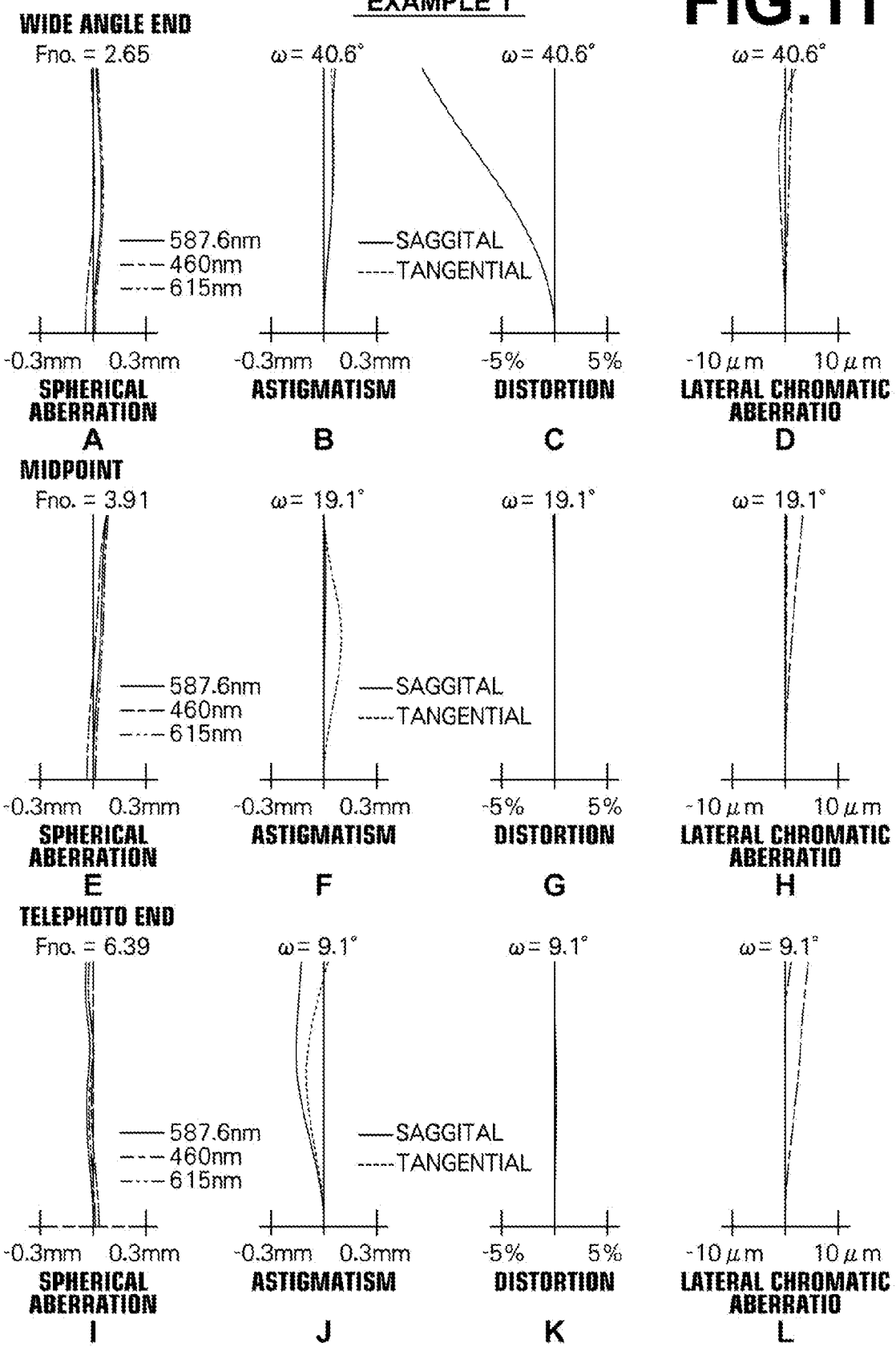
FIG. 11 illustrates various types of aberrations of the zoom lens of Example 1 when the zoom is set to the wide angle end, a midpoint, and telephoto end.
Figure 12:
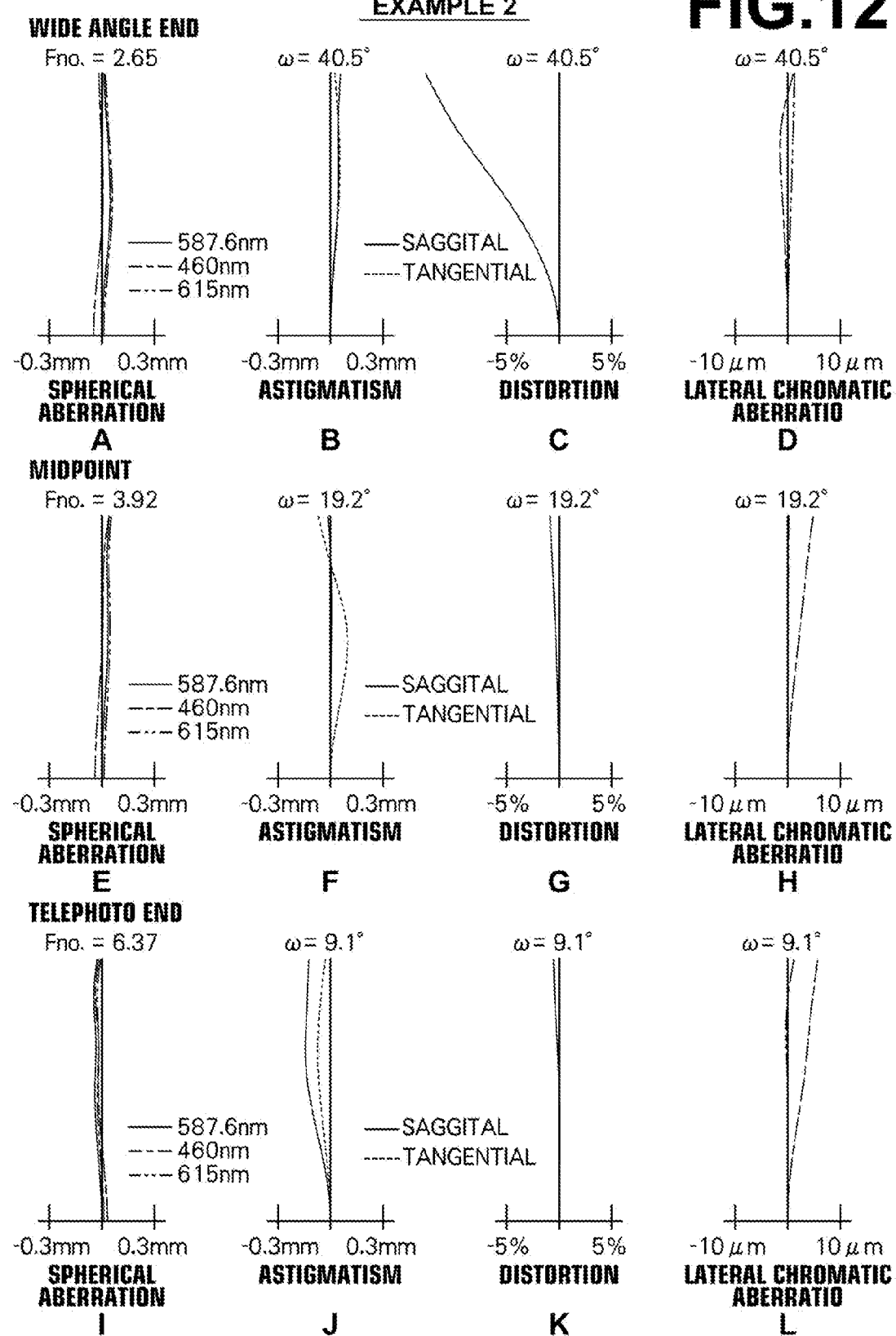
FIG. 12 illustrates various types of aberrations of the zoom lens of Example 2 when the zoom is set to the wide angle end, a midpoint, and telephoto end.
Figure 13:
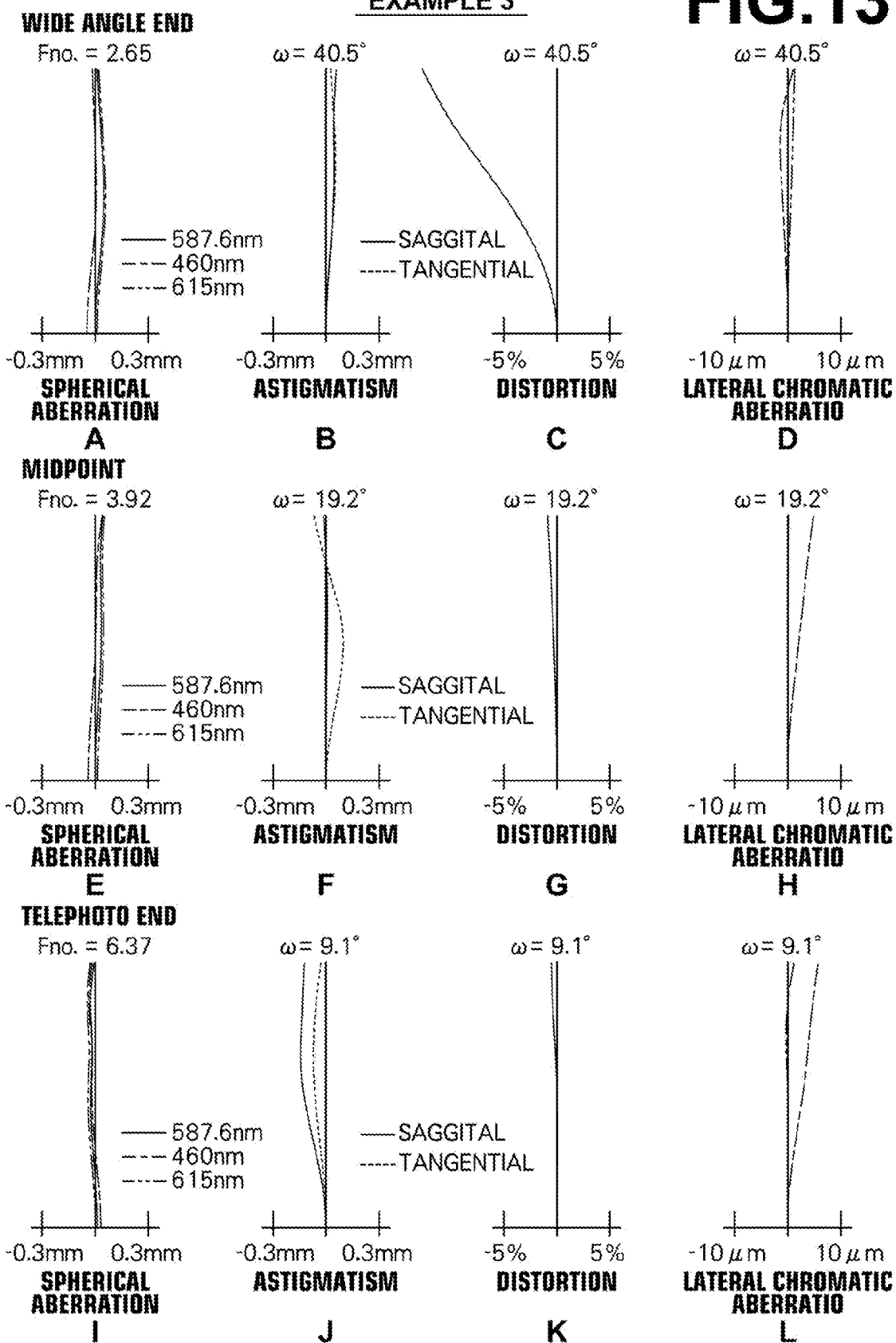
FIG. 13 illustrates various types of aberrations of the zoom lens of Example 3 when the zoom is set to the wide angle end, a midpoint, and telephoto end.
Figure 14:
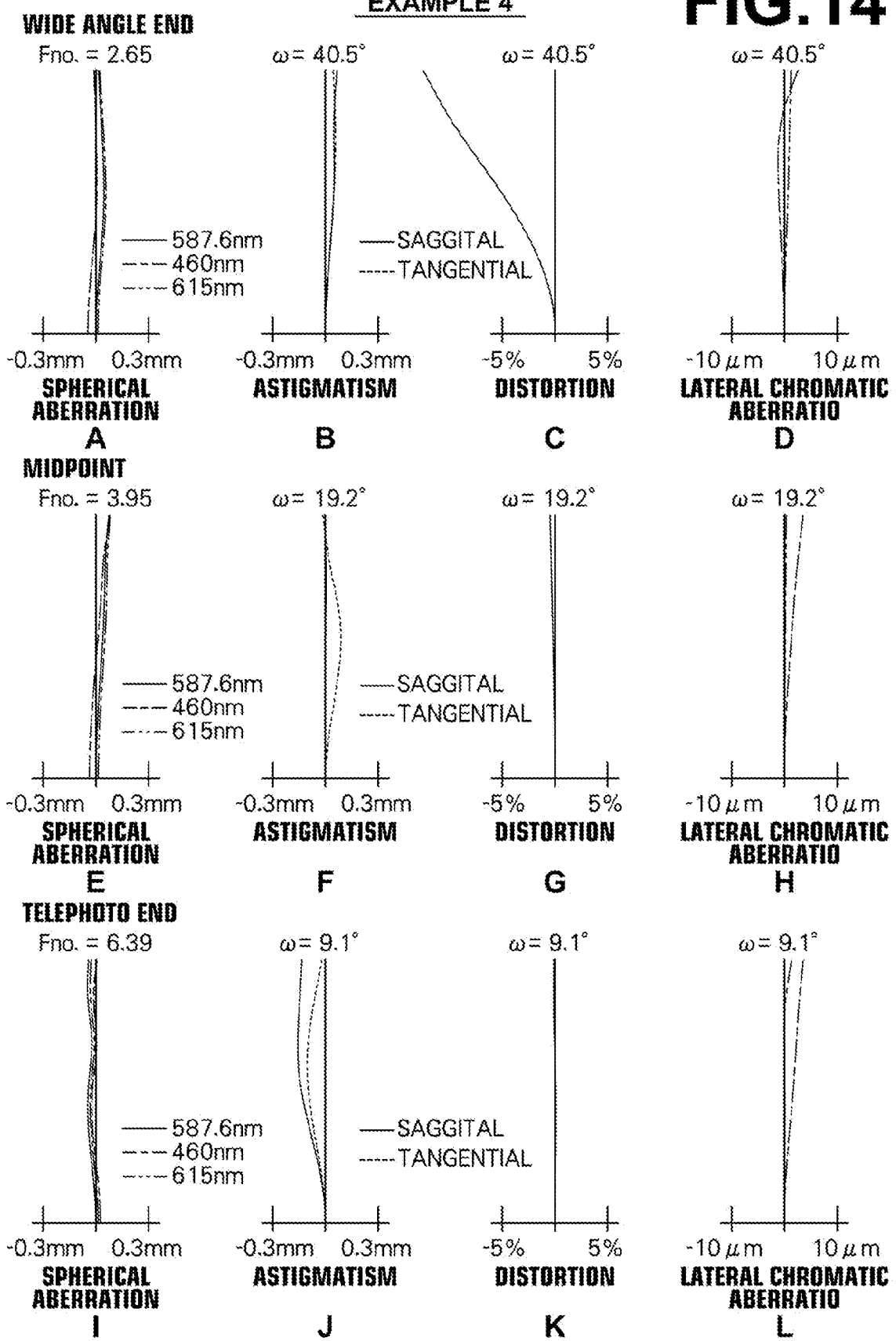
FIG. 14 illustrates various types of aberrations of the zoom lens of Example 4 when the zoom is set to the wide angle end, a midpoint, and telephoto end.
Figure 15:
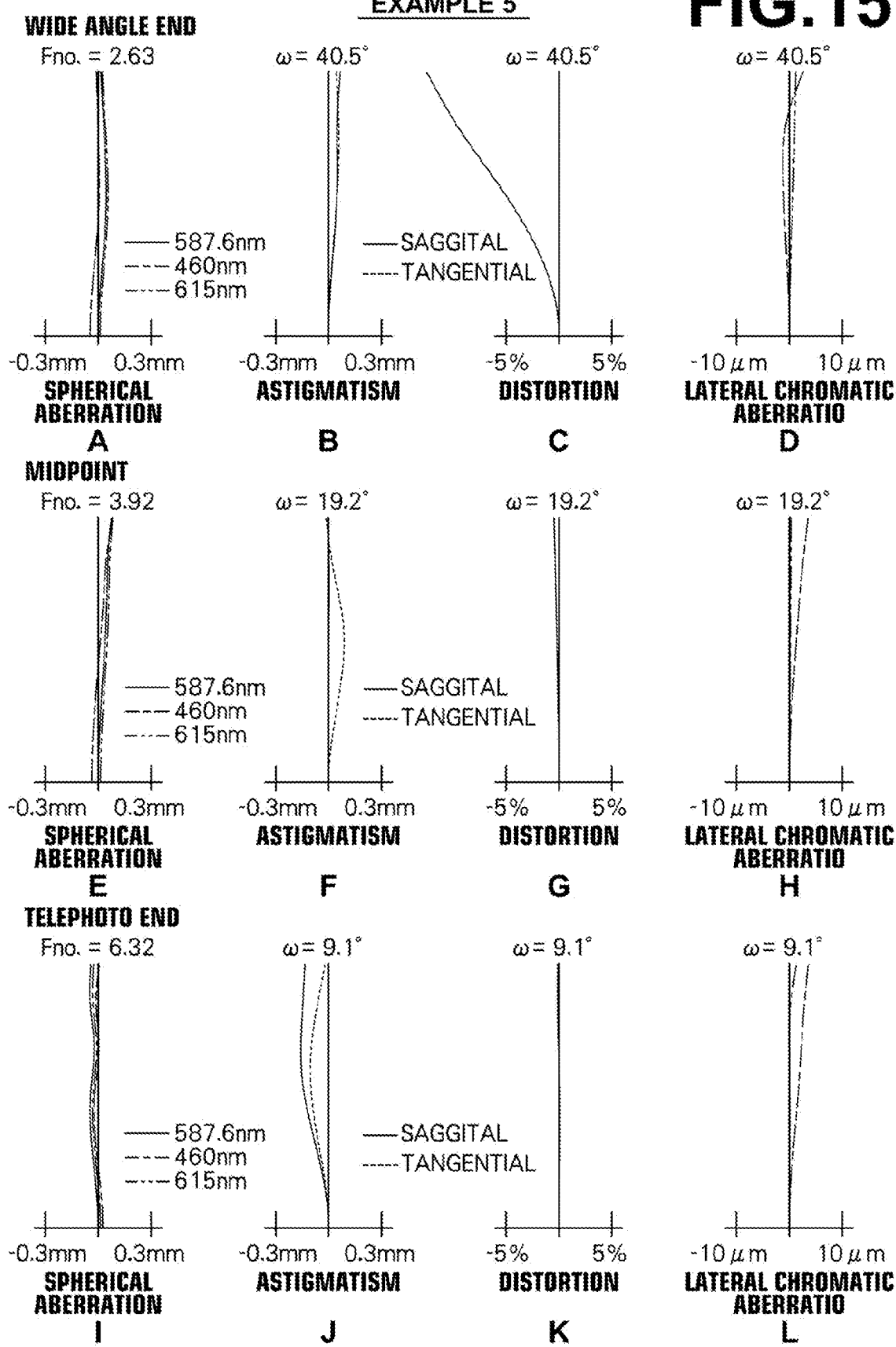
FIG. 15 illustrates various types of aberrations of the zoom lens of Example 5 when the zoom is set to the wide angle end, a midpoint, and telephoto end.
Figure 16:
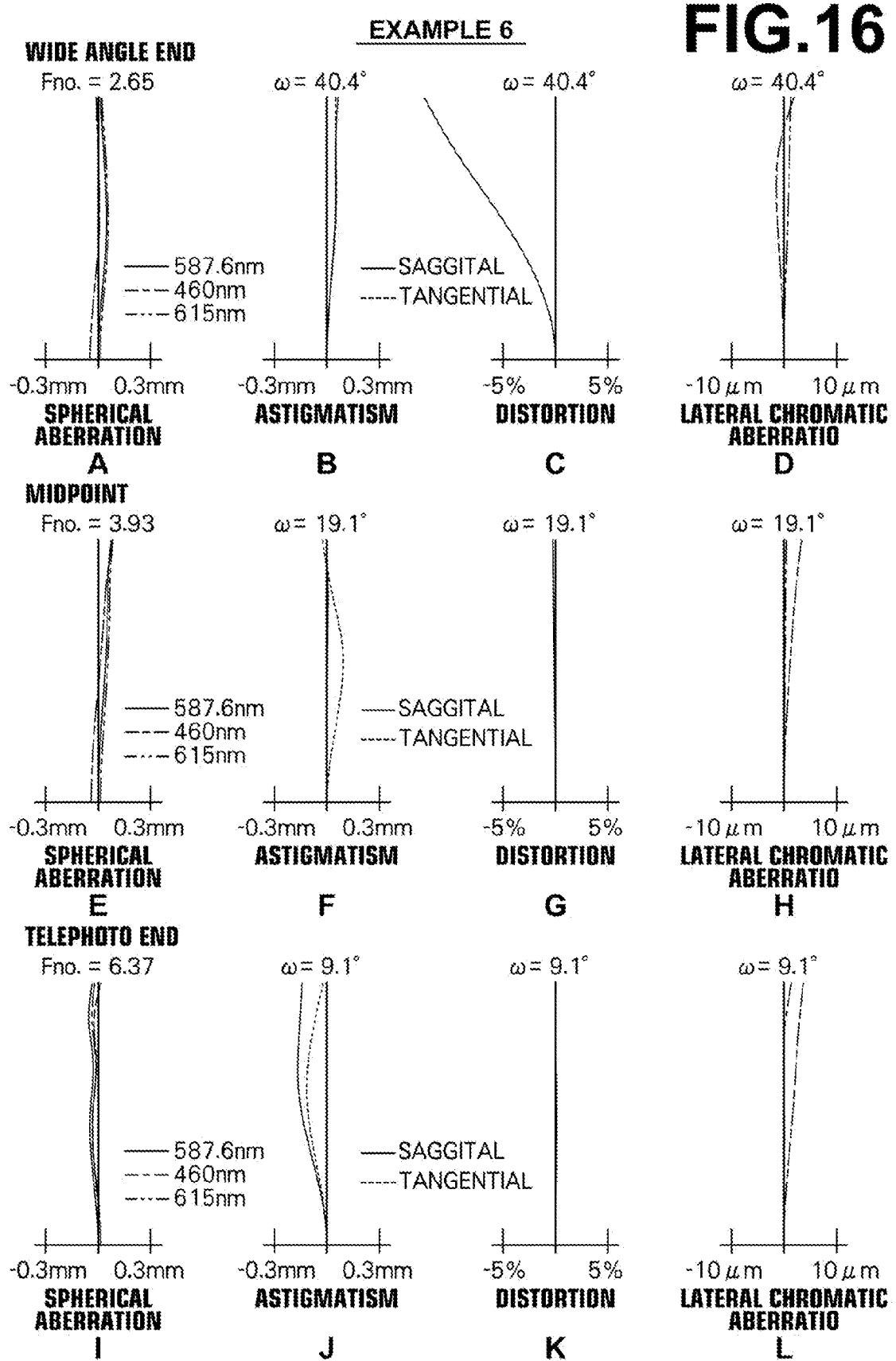
FIG. 16 illustrates various types of aberrations of the zoom lens of Example 6 when the zoom is set to the wide angle end, a midpoint, and telephoto end.
Figure 17:
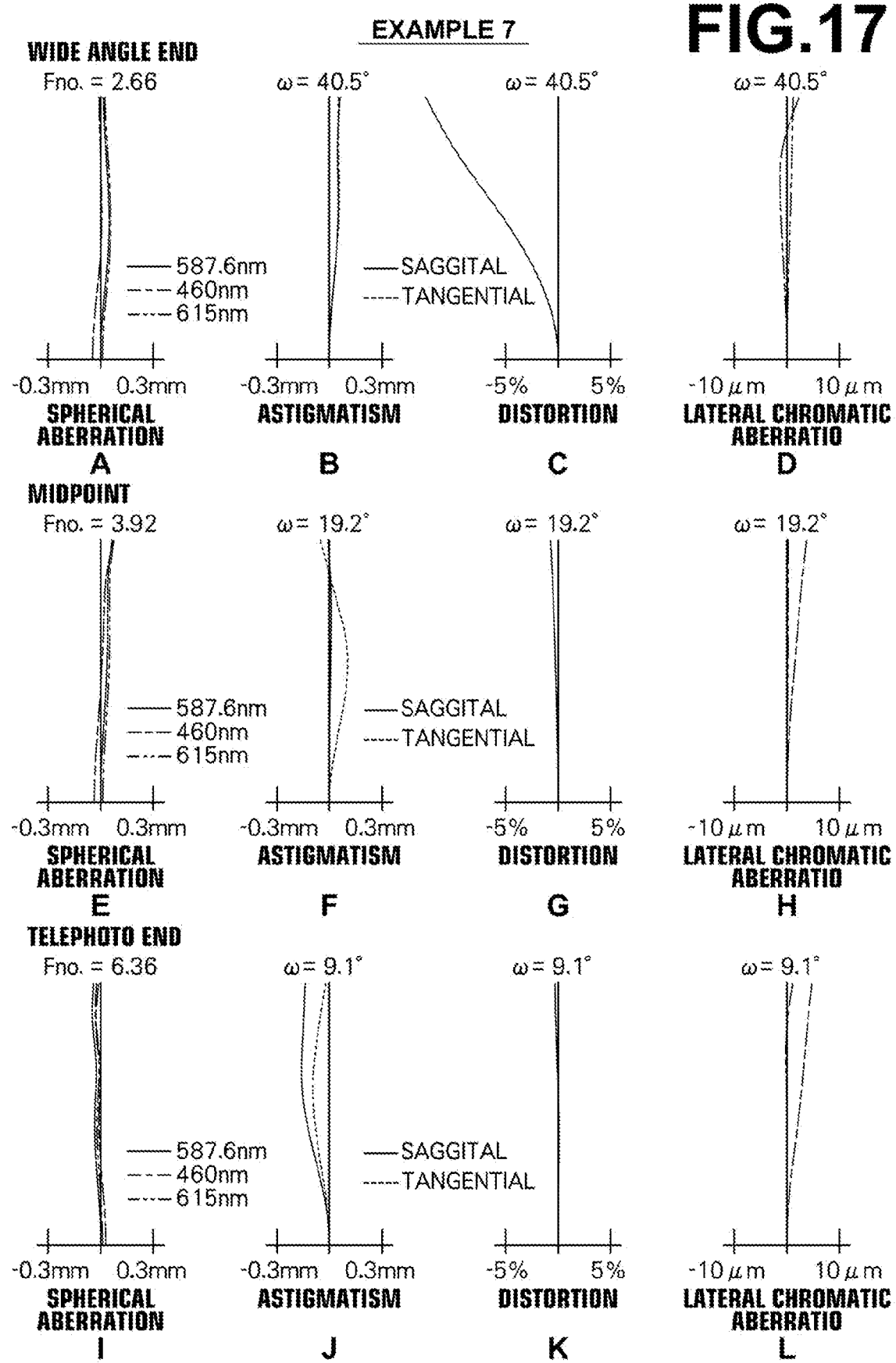
FIG. 17 illustrates various types of aberrations of the zoom lens of Example 7 when the zoom is set to the wide angle end, a midpoint, and telephoto end.

Hereinafter, a zoom lens of the present invention and an image pickup apparatus equipped with the zoom lens will be described with reference to the accompanying drawings.

FIG. 1 is a cross-sectional view of a zoom lens of the present invention and an image pickup apparatus equipped with the zoom lens, illustrating a schematic configuration thereof. FIG. 2A is a perspective view of the image pickup apparatus equipped with the zoom lens, illustrating an overall view thereof. FIGS. 2B and 2C illustrate the appearance of the zoom lens when it is retracted, in which FIG. 2B illustrates the state of the zoom lens before being retracted while FIG. 2C illustrates the state of the zoom lens after being retracted.

The image pickup apparatus 200 shown in the drawings includes an apparatus body 220, a retractable lens barrel 150 supported by the apparatus body 220, a zoom lens 100 disposed inside of the lens barrel 150, an image sensor 210 for capturing an optical image Hk representing a subject H formed through the zoom lens 100, and a filter Lf framed of a plane parallel plate disposed between the zoom lens 100 and image sensor 210.

As for the filter Lf, a low-pass filter, an infrared light cut filter, or the like may be used.

As illustrated in FIGS. 2A to 2C, the image pickup apparatus 200 is constructed to retract and accommodate the lens barrel 150 with the zoom lens 100 inside of the apparatus body 220.

The optical image Hk representing the subject H formed on an imaging surface 210J of the image sensor 210 through the zoom lens 100 is captured by the image sensor 210. Thereafter, image data D1 representing the subject H obtained by capturing the image are outputted from the image sensor 210. The image data D1 outputted from the image sensor 210 are inputted to a storage device 230 and stored therein.

The image sensor 210 may be a CCD image sensor, a CMOS image sensor, or the like.

The basic structure of the zoom lens will now be described.

<Basic Structure of Zoom Lens>

The zoom lens 100 includes three lens groups: a first lens group G1 having a negative power; a second lens group G2 having a positive power; and a third lens group G3 having a positive power, in addition to an aperture stop St which is moved integrally with the second lens group G2.

The three-group zoom lens 100 performs zooming by changing a distance between the first lens group G1 and second lens group G2, and a distance between the second lens group G2 and third lens group G3.

The aperture stop St is provided such that the positional relationship thereof with the second lens group G2, i.e., the positional relationship with each lens constituting the second lens group G2 is always maintained constant, including the time when zooming is performed.

Here, the aperture stop St is disposed on a further object side of the second group first lens L21 which is the lens disposed on the most object side in the second lens group G2, but an alternative design may be used in which the aperture stop St is disposed on a further image side of the second group fourth lens L24 which is the lens disposed on the most image side in the second lens group G2 or between the second group first lens L21 and second group fourth lens L24.

The first lens group G1 includes a negative first group first lens L11 with a concave surface facing the image side, a negative first group second lens L12 with a concave surface facing the image side, and a positive first group third lens L13 having at least one aspheric surface with a convex surface facing the object side arranged in this order from the object side.

The second lens group G2 includes a positive second group first lens L21 with a convex surface facing the object side, a positive second group second lens L22 with a convex surface facing the object side, a negative second group third lens L23 with a concave surface facing the image side, and a negative second group fourth lens 724 having at least one aspheric surface with a concave surface facing the image side arranged in this order from the object side.

Note that the second group second lens L22 and second group third lens L23 constitute a cemented lens $L_C$ having a positive power as a whole.

The third lens group G3 includes a positive third group first lens L31.

According to such configuration of the zoom lens 100, the use of a negative lens as the second group fourth lens L24 disposed on the most image side in the second lens group G2 allows the outer diameter of the second lens group which is smaller than the other lens groups (first and third lens groups) due to being positioned near the aperture stop to be further reduced. Accordingly, by moving and retracting the entire zoom lens 100 held in the lens barrel 150 in an optical direction (+Z direction in the drawings) while moving the second lens group G2 in a direction orthogonal to the optical axis (Y direction in the drawings), the thickness of the entire zoom lens 100 in an optical direction Z1 and the outer diameter of the lens barrel may be reduced. This may reduce the area in a digital camera body into which the taking lens is retracted.

Next, structures further limiting the basic structure of the zoom lens 100 will be described.

<Structures Further Limiting Basic Structure of Zoom Lens>
Structural elements further limiting the basic structure of the zoom lens 100, their operations, and effects will now be described. Note that these structural elements further limiting the basic structure are not essential for the zoom lens 100 of the present invention.

The zoom lens 100 of the present invention may be formed so as to satisfy one of the structural elements further limiting the basic structure or a combination of two or more of them.

The meaning of each parameter represented by each symbol appearing in conditional expressions (1) to (4) given below will be collectively described herein below:

fw is a focal length of the entire lens system at the wide angle end (which is positive if a point where light is condensed (condensing point or focal point) when a light ray is passed through the zoom lens is on the exit side of the lens and negative if it is on the incident side of the lens);

f13 is a focal length of the first group third lens;

f24 is a focal length of the second group fourth lens;

f31 is a focal length of the third group first lens;

f1 is a focal length of the first lens group;

LT is a distance on the optical axis Z1, when an optical image representing a subject in infinity is formed by setting the zoom at the telephoto end, between the object side lens surface of the first lens group first lens and the image forming plane on which the optical image is formed;

U is a zoom ratio; and

ω is a half angle of view at a maximum image height at the wide angle end.

Preferably, the zoom lens 100 described above is a three-group zoom lens with a zoom ratio of about 5×. More specifically, it is preferable that the zoom lens 100 is a three-group zoom lens having a zoom ratio greater than 4× and less than 6×.

Plastic lenses may be used for both the first group third lens L13 and the second group fourth lens L24. This allows weight and cost reductions to be realized for the zoom lens 100.

Further, for the third group first lens L31, a plastic lens having at least one aspheric surface may be used. This may reduce the overall length of the zoom lens 100, whereby weight and cost reductions may be realized for the zoom lens 100.

Note that the second group fourth lens L24 may have an aspheric surface only on an object side lens surface, only on an image side lens surface, or on each lens surface.

◇ Structural Limitation by Conditional Expression (1)

The conditional expression (1)–0.2<fw/f13+fw/f24<0.2 relates to the powers of the first group third lens L13 and second group fourth lens L24 which are formed of a plastic.

As a plastic lens has greater refractive index variation due to temperature change in comparison with a glass lens, the amount of focal shift is increased at the time of temperature change if the plastic lens has a high power. But, if the zoom lens 100 is formed to satisfy the conditional expression (1), the focal shift of the zoom lens 100 due to temperature change may be prevented.

If the zoom lens 100 is formed to exceed the upper limit or the lower limit of the conditional expression (1), however, there arises a problem that the combined power of the first group third lens L13 and second group fourth lens L24 is increased and the amount of focal shift at the time of temperature change is increased, whereby focusing becomes difficult.

◇ Structural Limitation by Conditional Expression (2)

The conditional expression (2): 0<fw/f13+fw/f24÷fw/f31<0.4 relates to the power of the first group third lens L13, the power of the second group fourth lens L24, and the power of the third group first lens L31.

If the zoom lens 100 is formed to satisfy the conditional expression (2), the focal shift of the zoom lens 100 due to temperature change may be prevented.

That is, in the case where the lens barrel 150 is made of a plastic material having a higher linear expansion coefficient that that of a metal, the lens barrel 150 is expanded greatly as the temperature increases and the length of the lens barrel 150 in an optical axis direction is increased, so that the distance between each lens constituting the zoom lens 100 and the imaging surface 210J is increased. Further, as the refractive index of the plastic material is reduced with increase in the temperature, the power of the plastic lens is reduced.

For this reason, the increase in the back focus due to increase in the temperature can be compensated (canceled) by the increase in the length of the lens barrel 150 holding the plastic lens in the optical axis direction due to the expansion of the lens barrel 150. Therefore, in the case where the first group third lens L13, the second group fourth lens L24, and the third group first lens L31 are plastic lenses, if the combined power of the lenses falls within the range of inequality defined by the conditional expression (2), the misalignment due to temperature change between the position of the imaging surface 210j and the position of the optical image Hk formed through the zoom lens 100 (image location of the subject) may be prevented.

If the zoom lens 100 is formed to fall below the lower limit of the conditional expression (2), it is difficult to compensate for the focal shift due to the expansion of the lens barrel 150 at the time of temperature increase.

Contrary to this, if the zoom lens 100 is formed to exceed the upper limit of the conditional expression (2), the compensation for the focal shift due to the expansion of the lens barrel 150 becomes excessive and it is difficult to prevent the misalignment between the position of the imaging surface 210J and the position of the optical image Hk formed through the zoom lens 100, i.e., the focus shift of the image pickup apparatus due to temperature change.

◇ Structural Limitation by Conditional Expression (3)

The conditional expression (3): −3.0<f1/fw<−2.3 and a more preferable conditional expression (3A): −2.8<f1/fw<−2.5 relate to the focal length of the first lens group G1.

If the zoom lens 100 is formed to satisfy the conditional expression (3), aberrations over the entire zoom range may be prevented and downsizing may be realized.

If the zoom lens 100 is formed to fall below the lower limit of the conditional expression (3), however, the power of the first lens group G1 becomes unduly weak and the overall lens length is increased, thereby causing difficulty in downsizing the zoom lens 100.

Contrary to this, if the zoom lens 100 is formed to exceed the upper limit of the conditional expression (3), the power of the first lens group G1 becomes unduly strong and aberration correction over the entire zoom range is difficult.

Note that if the zoom lens 100 is formed to satisfy the conditional expression (3A), more sophisticated aberration correction over the entire zoom range and further downsizing of the lens may be realized.

◇ Structural Limitation by Conditional Expression (4)

The conditional expression (4): 1.8<LT/(fw×U×tan ω)<2.3 and a more preferable conditional expression (4A): 1.9<LT/(fw×U×tan ω)<2.1 relate to the overall optical length of the zoom lens when the zoom is set to the telephoto end.

If the zoom lens 100 is formed to satisfy the conditional expression (4), downsizing and prevention of aberrations over the entire zoom range may be achieved, yet a relatively high zoom ratio of about 5× is realized.

If the zoom lens 100 is formed to fall below the lower limit of the conditional expression (4), however, there arises a problem that the correction of aberrations, such as field curvature and the like, becomes difficult, although it becomes easier to realize downsizing and a relatively high zoom ratio.

Contrary to this, if the zoom lens 100 is formed to exceed the upper limit of the conditional expression (4), there arises a problem that it is difficult to achieve downsizing of a zoom lens having a relatively high zoom ratio of about 5×, although it becomes easier to correct aberrations, such as field curvature and the like.

Note that if the zoom lens 100 is formed to satisfy the conditional expression (4A), more sophisticated aberration correction over the entire zoom range and further downsizing of the lens may be realized.

When taking a picture using the digital camera 200, high speed focusing is required. This may be realized by the movement of a light weight lens group at the time of focusing, i.e., by composing the third lens group with one positive lens and moving the third lens group at the time of focusing. Further, by composing the third lens group with a light weight plastic lens, higher speed focusing is possible.

SPECIFIC EXAMPLES

Hereinafter, numerical data and the like of Examples 1 to 7 of the zoom lens according to the present invention will be described with reference to FIGS. 3 to 17 and Tables 1 to 8.

FIG. 3 is a cross-sectional view, commonly illustrating a schematic configuration of zoom lenses of Examples 1 to 7 when the zoom is set to a wide angle end.

FIGS. 4 to 10 are cross-sectional views of the zoom lenses of Examples 1 to 7 respectively, each illustrating schematic configurations thereof when the zoom is set to a wide angle end, a telephoto end, and a midpoint thereof and comparatively illustrating the states in which the zoom is set to the wide angle end, midpoint, and telephoto end in this order.

FIGS. 11 to 17 show various aberrations of zoom lenses of Example 1 to 7 respectively. Each drawing illustrates aberrations of each zoom lens when the zoom is set to the wide angle end, midpoint, and telephoto end in this order.

Note that the same symbols in FIGS. 3 to 10 as those in FIG. 1 illustrating the zoom lens 100 represent corresponding components.

Each of the symbols S1 to S18 in FIG. 3 represents $i^{th}$ (i=1, 2, 3, -----) optical surface (lens surface, aperture stop St, filter surface) which is sequentially increased from the object side toward the image side. Here, the aperture stop St corresponds to the symbol S7, the object side surface and image side surface of the filter Lf correspond to symbols S17 and S18 respectively, and the other symbols among S1 to S18 correspond to lens surfaces.

Symbols L11, L12, -----, L31 shown in FIG. 3 and the like represent each lens disposed in the zoom lens. Note that the symbol Lc represents a cemented lens of two lenses represented by the symbols L22 and L23. Further, the symbol Lf represents an optical member, such as a low-pass filter formed of a plane parallel plate, infrared light cut filter, or the like. The optical member Lf is not an essential component of the zoom lens.

The symbols G1 to G3 shown in FIGS. 3 to 10 and the like represent lens groups disposed in the zoom lens respectively.

Tables 1 to 7 illustrate basic data of zoom lenses of Examples 1 to 7 respectively.

Lens data are provided on the upper side of each of Tables 1 to 7 (indicated by the symbol (a)). An asterisk (*) attached to the surface number of the lens data indicates that the surface is an aspheric surface.

The aspheric surface expression used here is given below:

$$Z = \frac{Y^2/R}{1+(1-K \cdot Y^2/R^2)^{\frac{1}{2}}} + \sum_{i=3}^{n} Ai \cdot Y^i$$

where,
Z: depth of aspheric surface (a length of the vertical line from a point on the aspheric surface at height Y to a flat surface orthogonal to an optical axis to which the aspheric vertex contact) (mm),
Y: height (distance from the optical axis) (mm),
R: paraxial radius of curvature, and
K, Ai: aspheric coefficients (i=3 to n).

The following values at the wide angle end, midpoint, and telephoto end are provided in the center of each of Tables 1 to 7 (indicated by the symbol (b)): f representing focal lengths of the overall lens system (unit of mm); fno representing F numbers; 2ω representing total angles of view; and D6, D14, and D16 representing distances between each of lens groups (unit of mm).

Further, aspheric coefficients are provided on the lower side of each of Tables 1 to 7 (indicated by the symbol (c)).

Table 8 provides values whose ranges are defined by inequality expressions of the conditional expressions (1) to (4) (values calculated by formulas described in inequality expressions) for each of zoom lenses of Examples 1 to 7.

Note that each of the zoom lenses of Examples 1 to 7 simultaneously satisfies all of the conditional expressions (1) to (4).

In the lens data of each of Table 1 to 7, the surface number Si represents the number of $i^{th}$ (i=1, 2, 3, -----) lens surface or the like which is sequentially increased from the object side toward the image side. Note that the lens data includes the aperture stop St. The surface number Si corresponds to each symbol in FIG. 3.

The optical member Lf, which is a filter, is included in the lens data as a plane parallel plate.

The radius of curvature Ri represents the radius of curvature of $i^{th}$ (i=1, 2, 3, -----) surface and the surface distance Di (i=1, 2, 3, -----) represents the surface distance between $i^{th}$ surface and $(i+1)^{th}$ surface on the optical axis Z1. The symbols Ri and Di in the lens data correspond to the symbol Si (i=1, 2, 3, -----) representing the lens surface or the like.

The column of surface distance Di (i=1, 2, 3, -----) includes a numerical value representing the surface distance or a symbol Dn (n is a numerical value). The place where the symbol Dn is provided corresponds to a surface distance between lens groups (air space) and such a surface distance (air space) varies with the change in zoom magnification.

Ndj represents the refractive index of $j^{th}$ (j=1, 2, 3, -----) optical member constituting a lens or filter, in which j increases sequentially from the object side toward the image side, with respect to the wavelength of 587.6 nm (d-line), while vdj represents the Abbe number of $j^{th}$ optical member with reference to the d-line.

The Abbe number v of the optical member with reference to the d-line is a value obtained by the formula of v=(Nd−1)/NF−NC), in which NF represents a refractive index of the optical member with respect to F-line (486.1 nm), Nd represents a refractive index of the optical member with respect to d-line (587.6 nm), and NC represents a refractive index of the optical member with respect to C-line (656.3 nm).

Here, the first group first lens L11 corresponds to the first optical member, the first group second lens L12 corresponds to the second optical member, the first group third lens L13 corresponds to the third optical member, the second group first lens L21 corresponds to the fourth optical member, the second group second lens L22 corresponds to the fifth optical member, the second group third lens L23 corresponds to the sixth optical member, the second group fourth lens L24 corresponds to the seventh optical member, the third group first lens L31 corresponds to the eighth optical member, and the filter Lf corresponds to the ninth optical member.

In the lens data in Tables 1 to 7, the radius of curvature and surface distance are indicated in mm, and the radius of curvature is indicated as positive if it is convex to the object side and as negative if it is convex to the image side.

The lenses corresponding to the symbols L13, L24, and L31 in the zoom lenses of Examples 1 to 7 may be plastic lenses.

Note that Tables 1 to 8 will be collectively provided at the end of this section, the "Best Mode for Carrying out the Invention".

Each of FIGS. 11 to 17 illustrating various aberrations of each of zoom lenses of Examples 1 to 7 shows aberrations with respect to light having wavelengths of 587.6 nm, 460.0 nm, and 615.0 nm respectively.

The aberration diagrams corresponding to the symbols A to D in each of FIGS. 11 to 17 illustrate aberrations when the zoom is set to the wide angle end, in which A is spherical aberration, B is astigmatism, C is distortion, and D is lateral chromatic aberration.

The aberration diagrams corresponding to the symbols E to H in each drawing illustrate aberrations when the zoom is set to the midpoint between the wide angle end and telephoto end, in which E is spherical aberration, F is astigmatism, G is distortion, and H is lateral chromatic aberration.

The aberration diagrams corresponding to the symbols I to L in each drawing illustrate aberrations when the zoom is set to the telephoto end, in which I is spherical aberration, J is astigmatism, K is distortion, and L is lateral chromatic aberration.

Each distortion diagram illustrates a deviation from an ideal image height obtained by f×tan θ, where f is a focal length of the entire lens system and e is a half angle of view (treated as a variable, $0 \leq \theta \leq \omega$).

As is known from the numerical data, aberration diagrams, and the like of Examples 1 to 7, the zoom lens of the present invention is compact while capable of preventing aberrations over the entire zoom range.

It should be understood that the present invention is not limited to each of aforementioned Examples, and various changes and modifications may be made without departing from the spirit of the invention. For example, values of radius of curvature of each lens, surface distance, refractive index, and the like are not limited to those shown in each table and may take other values.

TABLE 1

(a) Basic Lens Data [Example 1]

| Si (Surf. No.) | Ri (R. of Cur.) | Di (Surf. Dis.) | Ndj (Ref. Index) | vdj (Abbe No.) |
|---|---|---|---|---|
| 1 | 36.7347 | 0.60 | 1.72916 | 54.7 |
| 2 | 7.9829 | 1.92 | | |
| 3 | 24.7128 | 0.60 | 1.48749 | 70.2 |
| 4 | 9.0339 | 1.08 | | |
| *5 | 9.6257 | 2.00 | 1.63355 | 23.6 |
| *6 | 17.9074 | (variable) D6 | | |
| 7 | ∞(aper. stop) | 0.80 | | |
| 8 | 7.6372 | 1.72 | 1.48749 | 70.2 |
| 9 | −34.6835 | 0.10 | | |
| 10 | 5.6777 | 1.96 | 1.62041 | 60.3 |
| 11 | −20.8400 | 0.50 | 1.67270 | 32.1 |
| 12 | 6.4505 | 0.55 | | |
| *13 | 7.5867 | 0.80 | 1.53389 | 56.0 |
| *14 | 4.8000 | (variable) D14 | | |
| *15 | −20.1751 | 1.80 | 1.53389 | 56.0 |
| *16 | −7.7134 | (variable) D16 | | |
| 17 | ∞ | 0.80 | 1.51680 | 64.2 |
| 18 | ∞ | | | |

(b) Zoom Data [Example 1]

| Item | W.A. End | Midpoint | T.P. End |
|---|---|---|---|
| f | 5.15 | 11.12 | 24.03 |
| Fno | 2.65 | ~ | 6.39 |
| 2ω(deg.) | 81.2 | ~ | 18.2 |
| D6 | 18.32 | 6.83 | 0.83 |
| D14 | 3.02 | 10.19 | 22.39 |
| D16 | 4.87 | 3.60 | 3.33 |

(c) Aspheric Data [Example 1]

| Surf. No. Si | Aspheric Coefficient | | | | |
|---|---|---|---|---|---|
| | K | A3 | A4 | A5 | A6 |
| 5 | −6.536023E+00 | 1.852023E−04 | 4.641201E−04 | −8.074353E−08 | −1.513596E−06 |
| 6 | −9.476869E+00 | 2.744159E−05 | −3.813722E−04 | 1.054710E−05 | 6.222159E−06 |
| 13 | 2.588209E+00 | −1.861327E−02 | 3.073267E−02 | −2.682993E−02 | 1.132243E−02 |

TABLE 1-continued

| | | | | | |
|---|---|---|---|---|---|
| 14 | 3.056713E+00 | −2.157089E−02 | 3.610985E−02 | −3.167266E−02 | 1.388421E−02 |
| 15 | −9.661052E+00 | −7.948730E−03 | 1.002104E−02 | −7.198895E−03 | 2.144705E−03 |
| 16 | −9.033940E+00 | −7.175693E−03 | 8.456316E−03 | −8.301204E−03 | 3.218892E−03 |

| | Aspheric Coefficient | | | | |
|---|---|---|---|---|---|
| Surf. No. Si | A7 | A8 | A9 | A10 | A11 |
| 5 | −6.734279E−06 | 2.056100E−07 | 6.234641E−08 | 3.351502E−08 | −1.760755E−10 |
| 6 | −4.777539E−06 | −1.008150E−07 | 7.026629E−08 | 3.050466E−08 | −2.306218E−10 |
| 13 | −1.051022E−03 | −9.923793E−04 | 3.765178E−04 | −4.212205E−05 | |
| 14 | −1.950867E−03 | −8.454113E−04 | 3.911294E−04 | −5.637230E−05 | |
| 15 | −5.700488E−06 | −1.060219E−04 | 2.150944E−05 | −1.265600E−06 | |
| 16 | −5.072581E−04 | 4.287638E−06 | 6.892789E−06 | −4.802247E−07 | |

| | Aspheric Coefficient | | | | |
|---|---|---|---|---|---|
| Surf. No. Si | A12 | A13 | A14 | A15 | A16 |
| 5 | −4.402142E−10 | −1.815186E−11 | −1.985589E−11 | −7.130587E−13 | 4.849719E−13 |
| 6 | −2.955736E−10 | −6.134747E−12 | −2.601432E−11 | −2.317947E−12 | 4.794507E−13 |
| 13 | | | | | |
| 14 | | | | | |
| 15 | | | | | |
| 16 | | | | | |

| | Aspheric Coefficient | | | |
|---|---|---|---|---|
| Surf. No. Si | A17 | A18 | A19 | A20 |
| 5 | 1.486081E−15 | 1.798424E−15 | 1.191914E−15 | −2.261812E−16 |
| 6 | −1.102609E−14 | −5.816661E−15 | 1.135200E−14 | −1.425313E−15 |
| 13 | | | | |
| 14 | | | | |
| 15 | | | | |
| 16 | | | | |

(*Aspheric Surface)

TABLE 2

(a) Basic Lens Data [Example 2]

| Si (Surf. No.) | Ri (R. of Cur.) | Di (Surf. Dis.) | Ndj (Ref. Index) | νdj (Abbe No.) |
|---|---|---|---|---|
| 1 | 29.3321 | 0.60 | 1.72916 | 54.7 |
| 2 | 8.0000 | 1.86 | | |
| 3 | 23.3721 | 0.60 | 1.48749 | 70.2 |
| 4 | 7.6388 | 1.16 | | |
| *5 | 8.6988 | 2.00 | 1.63355 | 23.6 |
| *6 | 14.9343 | (variable) D6 | | |
| 7 | ∞(aper. stop) | 0.80 | | |
| 8 | 7.5000 | 1.72 | 1.48749 | 70.2 |
| 9 | −31.9824 | 0.10 | | |
| 10 | 5.7260 | 1.96 | 1.60311 | 60.6 |
| 11 | −16.2998 | 0.50 | 1.66680 | 33.1 |
| 12 | 6.4612 | 0.61 | | |
| *13 | 6.8405 | 0.80 | 1.53389 | 56.0 |
| *14 | 4.9000 | (variable) D14 | | |
| *16 | −20.0001 | 1.80 | 1.53389 | 56.0 |
| *16 | −8.0258 | (variable) D16 | | |
| 17 | ∞ | 0.80 | 1.51680 | 64.2 |
| 18 | ∞ | | | |

(b) Zoom Data [Example 2]

| Item | W.A. End | Midpoint | T.P. End |
|---|---|---|---|
| f | 5.16 | 11.15 | 24.10 |
| Fno | 2.85 | ~ | 6.37 |
| 2ω(deg.) | 81.0 | ~ | 18.2 |

TABLE 2-continued

| | | | |
|---|---|---|---|
| D6 | 17.36 | 6.65 | 0.85 |
| D14 | 3.09 | 10.44 | 22.35 |
| D16 | 4.70 | 3.13 | 3.30 |

(c)
Aspheric Data [Example 2]

Aspheric Coefficient

| Surf. No. Si | K | A3 | A4 | A5 | A6 |
|---|---|---|---|---|---|
| 5 | −5.641354E+00 | 2.884967E−04 | 5.155029E−04 | −5.713444E−06 | 1.257970E−07 |
| 6 | −7.997675E+00 | 1.150896E−04 | −5.010111E−04 | 5.349812E−05 | −3.269728E−06 |
| 13 | 2.622216E+00 | −1.881595E−02 | 3.046610E−02 | −2.653879E−02 | 1.110237E−02 |
| 14 | 3.035519E+00 | −2.178283E−02 | 3.618376E−02 | −3.152664E−02 | 1.376731E−02 |
| 15 | 8.496277E+00 | −8.152578E−03 | 9.987614E−03 | −7.155515E−03 | 2.125877E−03 |
| 16 | −9.841937E+00 | −7.747239E−03 | 8.547870E−03 | −8.442669E−03 | 3.236650E−03 |

Aspheric Coefficient

| Surf. No. Si | A7 | A8 | A9 | A10 | A11 |
|---|---|---|---|---|---|
| 5 | −7.693696E−06 | 1.076578E−07 | 9.846628E−08 | 3.576974E−08 | −3.890852E−12 |
| 6 | −5.084521E−06 | 5.372147E−08 | 8.911948E−08 | 2.943685E−08 | −1.745175E−10 |
| 13 | −9.879284E−04 | −9.820345E−04 | 3.625761E−04 | −3.938567E−05 | |
| 14 | −1.924456E−03 | −8.275555E−04 | 3.806091E−04 | −5.466465E−05 | |
| 15 | −4.896424E−05 | −1.040039E−04 | 2.061743E−05 | −1.186128E−06 | |
| 16 | −4.976085E−04 | 2.514372E−06 | 6.937935E−06 | −4.739838E−07 | |

Aspheric Coefficient

| Surf. No. Si | A12 | A13 | A14 | A15 | A16 |
|---|---|---|---|---|---|
| 5 | −4.374891E−10 | −3.382565E−11 | −2.063360E−11 | −8.055306E−13 | 4.680739E−13 |
| 6 | −3.286004E−10 | −1.938538E−11 | −2.492209E−11 | −2.270088E−12 | 4.482191E−13 |
| 13 | | | | | |
| 14 | | | | | |
| 15 | | | | | |
| 16 | | | | | |

Aspheric Coefficient

| Surf. No. Si | A17 | A18 | A19 | A20 |
|---|---|---|---|---|
| 5 | 1.722463E−14 | 3.670019E−15 | 1.059187E−15 | −3.217332E−16 |
| 6 | −6.249420E−15 | −4.694246E−15 | 1.102838E−14 | −1.438611E−15 |
| 13 | | | | |
| 14 | | | | |
| 15 | | | | |
| 16 | | | | |

(*Aspheric Surface)

TABLE 3

(a)
Basic Lens Data [Example 3]

| Si (Surf. No.) | Ri (R. of Cur.) | Di (Surf. Dis.) | Ndj (Ref. Index) | νdj (Abbe No.) |
|---|---|---|---|---|
| 1 | 33.2423 | 0.60 | 1.72916 | 54.7 |
| 2 | 8.0000 | 1.86 | | |
| 3 | 22.7134 | 0.60 | 1.48749 | 70.2 |
| 4 | 8.2522 | 1.13 | | |
| *5 | 9.1070 | 2.00 | 1.63355 | 23.6 |
| *6 | 16.1834 | (variable) D6 | | |
| 7 | ∞(aper. stop) | 0.80 | | |
| 8 | 7.5000 | 1.72 | 1.48749 | 70.2 |
| 9 | −34.9045 | 0.10 | | |
| 10 | 5.7000 | 1.96 | 1.60311 | 60.6 |
| 11 | −13.2981 | 0.50 | 1.64769 | 33.8 |
| 12 | 6.4061 | 0.58 | | |
| *13 | 7.3136 | 0.80 | 1.53389 | 56.0 |
| *14 | 4.8000 | (variable) D14 | | |

TABLE 3-continued

| | | | | |
|---|---|---|---|---|
| *15 | −20.4621 | 1.80 | 1.53389 | 56.0 |
| *16 | −7.8685 | (variable) D16 | | |
| 17 | ∞ | 0.80 | 1.51680 | 64.2 |
| 18 | ∞ | | | |

(b)
Zoom Data [Example 3]

| Item | W.A. End | Midpoint | T.P. End |
|---|---|---|---|
| f | 5.15 | 11.14 | 24.07 |
| Fno | 2.65 | ~ | 6.37 |
| 2ω(deg.) | 81.0 | ~ | 18.2 |
| D6 | 18.08 | 6.95 | 0.88 |
| D14 | 3.06 | 10.45 | 22.36 |
| D16 | 4.79 | 3.21 | 3.31 |

(c)
Aspheric Data [Example 3]

Aspheric Coefficient

| Surf. No. Si | K | A3 | A4 | A5 | A6 |
|---|---|---|---|---|---|
| 5 | −6.519999E+00 | 3.067922E−04 | 5.322847E−04 | −2.794520E−06 | −2.562578E−07 |
| 6 | −9.148179E+00 | 1.340085E−04 | −4.838756E−04 | 5.962620E−05 | −3.217278E−06 |
| 13 | 3.032297E+00 | −1.870453E−02 | 3.040951E−02 | −2.656512E−02 | 1.110315E−02 |
| 14 | 3.074666E+00 | −2.165871E−02 | 3.805469E−02 | −3.154300E−02 | 1.377033E−02 |
| 15 | 9.280312E+00 | −7.968754E−03 | 1.014300E−02 | −7.176415E−03 | 2.120546E−03 |
| 16 | −9.815764E+00 | −7.502669E−03 | 8.564623E−03 | −8.447251E−03 | 3.236368E−03 |

Aspheric Coefficient

| Surf. No. Si | A7 | A8 | A9 | A10 | A11 |
|---|---|---|---|---|---|
| 5 | −7.766490E−06 | 1.009822E−07 | 9.771132E−08 | 3.564211E−08 | −3.625204E−11 |
| 6 | −5.187473E−06 | 3.419973E−08 | 8.616509E−08 | 2.898846E−08 | −2.562670E−10 |
| 13 | −9.853988E−04 | −9.810909E−04 | 3.626511E−04 | −3.957516E−05 | |
| 14 | −1.924302E−03 | −8.284010E−04 | 3.800353E−04 | −5.486160E−05 | |
| 15 | −4.918990E−05 | −1.038520E−04 | 2.064584E−05 | −1.198149E−06 | |
| 16 | −4.974975E−04 | 2.493892E−06 | 6.917014E−06 | −4.773358E−07 | |

Aspheric Coefficient

| Surf. No. Si | A12 | A13 | A14 | A15 | A16 |
|---|---|---|---|---|---|
| 5 | −4.443727E−10 | −3.504154E−11 | −2.082711E−11 | −8.268583E−13 | 4.678761E−13 |
| 6 | −3.447671E−10 | −3.923114E−12 | −2.559055E−11 | −2.401412E−12 | 5.141851E−13 |
| 13 | | | | | |
| 14 | | | | | |
| 15 | | | | | |
| 16 | | | | | |

Aspheric Coefficient

| Surf. No. Si | A17 | A18 | A19 | A20 |
|---|---|---|---|---|
| 5 | 1.786860E−14 | 3.937542E−15 | 1.136830E−15 | −3.031027E−16 |
| 6 | −1.101596E−14 | −5.563524E−15 | 1.136938E−14 | −1.465252E−15 |
| 13 | | | | |
| 14 | | | | |
| 15 | | | | |
| 16 | | | | |

(*Aspheric Surface)

TABLE 4

(a)
Basic Lens Data [Example 4]

| Si (Surf. No.) | Ri (R. of Cur.) | Di (Surf. Dis.) | Ndj (Ref. Index) | νdj (Abbe No.) |
|---|---|---|---|---|
| 1 | 49.4661 | 0.60 | 1.72916 | 54.7 |
| 2 | 8.0000 | 1.82 | | |
| 3 | 21.7509 | 0.60 | 1.48749 | 70.2 |
| 4 | 9.6055 | 1.05 | | |

TABLE 4-continued

| | | | | |
|---|---|---|---|---|
| *5 | 10.2835 | 2.00 | 1.63355 | 23.6 |
| *6 | 20.3226 | (variable) D6 | | |
| 7 | ∞(aper. stop) | 0.80 | | |
| 8 | 7.5000 | 1.72 | 1.48749 | 70.2 |
| 9 | −36.2405 | 0.10 | | |
| 10 | 5.7000 | 1.96 | 1.62041 | 60.3 |
| 11 | −15.6713 | 0.50 | 1.66680 | 33.1 |
| 12 | 6.5595 | 0.69 | | |
| *13 | 8.1012 | 0.80 | 1.53389 | 56.0 |
| *14 | 4.8000 | (variable) D14 | | |
| *15 | −20.2285 | 1.66 | 1.53389 | 56.0 |
| *16 | −7.6283 | (variable) D16 | | |
| 17 | ∞ | 0.80 | 1.51680 | 64.2 |
| 18 | ∞ | | | |

(b)
Zoom Data [Example 4]

| Item | W.A. End | Midpoint | T.P. End |
|---|---|---|---|
| f | 5.15 | 11.14 | 24.07 |
| Fno | 2.65 | ~ | 6.39 |
| 2ω(deg.) | 81.0 | ~ | 18.2 |
| D6 | 18.62 | 7.18 | 0.78 |
| D14 | 3.02 | 10.50 | 22.34 |
| D16 | 4.86 | 3.21 | 3.35 |

(c)
Aspheric Data [Example 4]

Aspheric Coefficient

| Surf. No. Si | K | A3 | A4 | A5 | A6 |
|---|---|---|---|---|---|
| 5 | −8.566586E+00 | 3.188172E−04 | 4.532793E−04 | 2.093222E−06 | −2.578252E−07 |
| 6 | −1.000000E+01 | 1.743097E−04 | −5.603951E−04 | 6.797436E−05 | −9.697040E−07 |
| 13 | 3.719178E+00 | −1.863154E−02 | 3.036501E−02 | −2.659217E−02 | 1.110332E−02 |
| 14 | 2.984301E+00 | −2.155570E−02 | 3.604640E−02 | −3.150692E−02 | 1.378783E−02 |
| 15 | 9.999996E+00 | −8.209403E−03 | 1.017399E−02 | −7.189793E−03 | 2.117346E−03 |
| 16 | −9.318362E+00 | −7.708843E−03 | 8.458669E−03 | −8.445921E−03 | 3.239241E−03 |

Aspheric Coefficient

| Surf. No. Si | A7 | A8 | A9 | A10 | A11 |
|---|---|---|---|---|---|
| 5 | −7.491480E−06 | 1.525125E−07 | 1.008871E−07 | 3.524176E−08 | −1.944190E−10 |
| 6 | −5.146572E−06 | 2.298975E−08 | 8.577594E−08 | 2.923380E−08 | −2.013429E−10 |
| 13 | −9.834348E−04 | −9.795989E−04 | 3.632468E−04 | −3.973732E−05 | |
| 14 | −1.929054E−03 | −8.311904E−04 | 3.808052E−04 | −5.343034E−05 | |
| 15 | −4.862274E−05 | −1.034332E−04 | 2.071296E−05 | −1.216657E−06 | |
| 16 | −4.971210E−04 | 2.598120E−06 | 6.921920E−08 | −4.762372E−07 | |

Aspheric Coefficient

| Surf. No. Si | A12 | A13 | A14 | A15 | A16 |
|---|---|---|---|---|---|
| 5 | −4.722938E−10 | −3.811877E−11 | −2.094775E−11 | −7.764310E−13 | 4.856012E−13 |
| 8 | −3.385354E−10 | −3.798592E−12 | −2.573751E−11 | −2.439836E−12 | 5.087201E−13 |
| 13 | | | | | |
| 14 | | | | | |
| 15 | | | | | |
| 16 | | | | | |

Aspheric Coefficient

| Surf. No. Si | A17 | A18 | A19 | A20 |
|---|---|---|---|---|
| 5 | 2.134690E−14 | 4.438601E−15 | 1.174133E−15 | −3.110456E−16 |
| 6 | −1.115309E−14 | −5.435450E−16 | 1.142886E−14 | −1.450426E−15 |
| 13 | | | | |
| 14 | | | | |
| 15 | | | | |
| 16 | | | | |

(*Aspheric Surface)

TABLE 5

(a) Basic Lens Data [Example 5]

| Si (Surf. No.) | Ri (R. of Cur.) | Di (Surf. Dis.) | Ndj (Ref. Index) | vdj (Abbe No.) |
|---|---|---|---|---|
| 1 | 69.5289 | 0.60 | 1.72916 | 54.7 |
| 2 | 8.0000 | 1.82 | | |
| 3 | 20.7590 | 0.60 | 1.48749 | 70.2 |
| 4 | 10.6422 | 0.85 | | |
| *5 | 10.9678 | 2.00 | 1.63355 | 23.6 |
| *6 | 23.1867 | (variable) D6 | | |
| 7 | ∞(aper. stop) | 0.80 | | |
| 8 | 7.5423 | 1.72 | 1.48749 | 70.2 |
| 9 | −51.0520 | 0.10 | | |
| 10 | 5.7000 | 1.96 | 1.65160 | 58.5 |
| 11 | −17.3984 | 0.50 | 1.66680 | 33.1 |
| 12 | 5.9320 | 0.49 | | |
| *13 | 7.3400 | 0.80 | 1.53389 | 56.0 |
| *14 | 4.8000 | (variable) D14 | | |
| *15 | −20.6243 | 1.56 | 1.53389 | 56.0 |
| *16 | −7.6086 | (variable) D16 | | |
| 17 | ∞ | 0.80 | 1.51680 | 64.2 |
| 18 | ∞ | | | |

(b) Zoom Data [Example 5]

| Item | W.A. End | Midpoint | T.P. End |
|---|---|---|---|
| f | 5.17 | 11.16 | 24.11 |
| Fno | 2.63 | ~ | 6.32 |
| 2ω(deg.) | 81.0 | ~ | 18.2 |
| D6 | 18.86 | 7.23 | 0.69 |
| D14 | 3.01 | 10.65 | 22.49 |
| D16 | 5.04 | 3.31 | 3.35 |

(c) Aspheric Data [Example 5]

Aspheric Coefficient

| Surf. No. Si | K | A3 | A4 | A5 | A6 |
|---|---|---|---|---|---|
| 5 | −9.999975E+00 | 3.177352E−04 | 4.335182E−04 | −4.206211E−07 | 1.143037E−07 |
| 6 | −9.907258E+00 | 1.853291E−04 | −5.962771E−04 | 6.853084E−05 | −3.407772E−07 |
| 13 | 3.050069E+00 | −1.860952E−02 | 3.035822E−02 | −2.660454E−02 | 1.109976E−02 |
| 14 | 2.986250E+00 | −2.152012E−02 | 3.601070E−02 | −3.151105E−02 | 1.378821E−02 |
| 15 | 9.206519E+00 | −8.293395E−03 | 1.018528E−02 | −7.196852E−03 | 2.116154E−03 |
| 16 | −9.009088E+00 | −7.728225E−03 | 8.506078E−03 | −8.444430E−03 | 3.237924E−03 |

Aspheric Coefficient

| Surf. No. Si | A7 | A8 | A9 | A10 | A11 |
|---|---|---|---|---|---|
| 5 | −7.349376E−06 | 1.713203E−07 | 1.019731E−07 | 3.511540E−08 | −2.455129E−10 |
| 6 | −5.100368E−08 | 2.582493E−08 | 8.629449E−08 | 2.934575E−08 | −1.864039E−10 |
| 13 | −9.840453E−04 | −8.794336E−04 | 3.633752E−04 | −3.977192E−05 | |
| 14 | −1.929985E−03 | −8.317867E−04 | 3.807450E−04 | −5.327359E−05 | |
| 15 | −4.873496E−05 | −1.034234E−04 | 2.071678E−05 | −1.215665E−06 | |
| 16 | −4.974954E−04 | 2.536410E−06 | 6.924915E−06 | −4.707147E−07 | |

Aspheric Coefficient

| Surf. No. Si | A12 | A13 | A14 | A15 | A16 |
|---|---|---|---|---|---|
| 5 | −4.819559E−10 | −3.942090E−11 | −2.106391E−11 | −7.762500E−13 | 4.884736E−13 |
| 6 | −3.382455E−10 | −4.285010E−12 | −2.590917E−11 | −2.479369E−12 | 5.017470E−13 |
| 13 | | | | | |
| 14 | | | | | |
| 15 | | | | | |
| 16 | | | | | |

Aspheric Coefficient

| Surf. No. Si | A17 | A18 | A19 | A20 |
|---|---|---|---|---|
| 5 | 2.211626E−14 | 4.568469E−15 | 1.186303E−15 | −3.124879E−16 |
| 6 | −1.203706E−14 | −5.463646E−15 | 1.145830E−14 | −1.436963E−15 |
| 13 | | | | |

TABLE 5-continued 14
15
16

(*Aspheric Surface)

TABLE 6

(a)
Basic Lens Data [Example 6]

| Si (Surf. No.) | Ri (R. of Cur.) | Di (Surf. Dis.) | Ndj (Ref. Index) | vdj (Abbe No.) |
|---|---|---|---|---|
| 1 | 47.3425 | 0.60 | 1.72916 | 54.7 |
| 2 | 8.0000 | 1.82 | | |
| 3 | 21.5551 | 0.60 | 1.48749 | 70.2 |
| 4 | 9.5014 | 1.01 | | |
| *5 | 9.9402 | 2.00 | 1.63355 | 23.6 |
| *6 | 19.0262 | (variable) D6 | | |
| 7 | ∞(aper. stop) | 0.80 | | |
| 8 | 7.5003 | 1.72 | 1.48749 | 70.2 |
| 9 | −40.4325 | 0.10 | | |
| 10 | 6.2645 | 1.96 | 1.65160 | 58.5 |
| 11 | −14.0415 | 0.50 | 1.68893 | 31.1 |
| 12 | 9.2197 | 0.66 | | |
| *13 | 11.3204 | 0.80 | 1.53389 | 56.0 |
| *14 | 4.8000 | (variable) D14 | | |
| *15 | −20.3877 | 1.65 | 1.53389 | 56.0 |
| *16 | −7.6044 | (variable) D16 | | |
| 17 | ∞ | 0.80 | 1.51680 | 64.2 |
| 18 | ∞ | | | |

(b)
Zoom Data [Example 6]

| Item | W.A. End | Midpoint | T.P. End |
|---|---|---|---|
| f | 5.17 | 11.16 | 24.12 |
| Fno | 2.65 | ~ | 6.37 |
| 2ω(deg.) | 80.8 | ~ | 18.2 |
| D6 | 18.61 | 7.11 | 0.82 |
| D14 | 3.02 | 10.39 | 22.31 |
| D16 | 4.83 | 3.33 | 3.35 |

(c)
Aspheric Data [Example 6]

Aspheric Coefficient

| Surf. No. Si | K | A3 | A4 | A5 | A6 |
|---|---|---|---|---|---|
| 5 | −6.873605E+00 | 3.460840E−04 | 2.921930E−04 | 4.779165E−05 | −4.732034E−06 |
| 6 | −7.806119E+00 | 1.378324E−04 | −5.326771E−04 | 5.072118E−05 | 1.158474E−06 |
| 13 | 8.637849E+00 | −1.932318E−02 | 3.119835E−02 | −2.671572E−02 | 1.106012E−02 |
| 14 | 2.889363E+00 | −2.232069E−02 | 3.705858E−02 | −3.175160E−02 | 1.381267E−02 |
| 15 | −6.288478E+00 | −8.829578E−03 | 1.044057E−02 | −7.339087E−03 | 2.125640E−03 |
| 16 | −1.000000E+01 | −8.316185E−03 | 8.593031E−03 | −8.424785E−03 | 3.226725E−03 |

Aspheric Coefficient

| Surf. No. Si | A7 | A8 | A9 | A10 | A11 |
|---|---|---|---|---|---|
| 5 | −7.632319E−06 | 2.231912E−07 | 1.094011E−07 | 3.531013E−08 | −3.372393E−10 |
| 6 | −4.974011E−06 | 4.277495E−08 | 8.807508E−08 | 2.922430E−08 | −2.932629E−10 |
| 13 | −9.866150E−04 | −9.751372E−04 | 3.654881E−04 | −4.044320E−05 | |
| 14 | −1.927896E−03 | −8.358347E−04 | 3.809327E−04 | −5.201790E−05 | |
| 15 | −4.597407E−05 | −1.034949E−04 | 2.059681E−05 | −1.207905E−06 | |
| 16 | −4.969890E−04 | 3.102417E−06 | 6.892955E−06 | −4.824772E−07 | |

Aspheric Coefficient

| Surf. No. Si | A12 | A13 | A14 | A15 | A16 |
|---|---|---|---|---|---|
| 5 | −5.071718E−10 | −4.201236E−11 | −2.114416E−11 | −7.328135E−13 | 4.987508E−13 |
| 6 | −3.722983E−10 | −9.694077E−12 | −2.643435E−11 | −2.439899E−12 | 5.334083E−13 |
| 13 | | | | | |
| 14 | | | | | |

TABLE 6-continued 15
16

| Surf. No. Si | Aspheric Coefficient | | | |
|---|---|---|---|---|
| | A17 | A18 | A19 | A20 |
| 5 | 2.423449E−14 | 4.570449E−15 | 1.150911E−15 | −3.173497E−16 |
| 6 | −4.203751E−15 | −4.210799E−15 | 1.148917E−14 | −1.505368E−15 |
| 13 | | | | |
| 14 | | | | |
| 15 | | | | |
| 16 | | | | |

(*Aspheric Surface)

TABLE 7

(a)
Basic Lens Data [Example 7]

| Si (Surf. No.) | Ri (R. of Cur.) | Di (Surf. Dis.) | Ndj (Ref. Index) | νdj (Abbe No.) |
|---|---|---|---|---|
| 1 | 33.3782 | 0.60 | 1.72916 | 54.7 |
| 2 | 8.0000 | 1.83 | | |
| 3 | 22.1003 | 0.60 | 1.48749 | 70.2 |
| 4 | 8.1941 | 1.14 | | |
| *5 | 9.3931 | 2.00 | 1.63355 | 23.6 |
| *6 | 17.1120 | (variable) D6 | | |
| 7 | ∞(aper. stop) | 0.80 | | |
| 8 | 7.5000 | 1.72 | 1.48749 | 70.2 |
| 9 | −41.3744 | 0.10 | | |
| 10 | 5.7000 | 1.96 | 1.60311 | 60.6 |
| 11 | −14.5640 | 0.50 | 1.63980 | 34.5 |
| 12 | 5.5966 | 0.53 | | |
| *13 | 5.9407 | 0.80 | 1.53389 | 56.0 |
| *14 | 4.8000 | (variable) D14 | | |
| *15 | −20.3469 | 1.79 | 1.53389 | 56.0 |
| *16 | −8.1411 | (variable) D16 | | |
| 17 | ∞ | 0.80 | 1.51680 | 84.2 |
| 18 | ∞ | | | |

(b)
Zoom Data [Example 7]

| Item | W.A. End | Midpoint | T.P. End |
|---|---|---|---|
| f | 5.16 | 11.15 | 24.10 |
| Fno | 2.66 | ~ | 6.36 |
| 2ω(deg.) | 81.0 | ~ | 18.2 |
| D6 | 18.21 | 6.87 | 0.79 |
| D14 | 3.06 | 10.47 | 22.51 |
| D16 | 4.98 | 3.42 | 3.34 |

(c)
Aspheric Data [Example 7]

| Surf. No. Si | Aspheric Coefficient | | | | |
|---|---|---|---|---|---|
| | K | A3 | A4 | A5 | A6 |
| 5 | −5.922443E+00 | 3.548851E−04 | 2.419256E−04 | 7.048941E−05 | −7.039181E−06 |
| 6 | −6.162127E+00 | 1.520136E−04 | −6.442543E−04 | 8.587128E−05 | −4.449582E−06 |
| 13 | 1.869634E+00 | −1.865863E−02 | 3.093765E−02 | −2.699959E−02 | 1.124204E−02 |
| 14 | 3.162606E+00 | −2.158474E−02 | 3.632133E−02 | −3.206412E−02 | 1.396122E−02 |
| 15 | 4.736802E+00 | −8.109417E−03 | 1.005706E−02 | −7.135331E−03 | 2.122050E−03 |
| 16 | −9.810139E+00 | −7.719554E−03 | 8.851478E−03 | −8.480873E−03 | 3.230142E−03 |

| Surf. No. Si | Aspheric Coefficient | | | | |
|---|---|---|---|---|---|
| | A7 | A8 | A9 | A10 | A11 |
| 5 | −8.186064E−06 | 1.244442E−07 | 1.069455E−07 | 3.751075E−08 | 5.152143E−11 |
| 6 | −6.006350E−06 | 2.903962E−08 | 1.073495E−07 | 3.306437E−08 | −5.542202E−11 |
| 13 | −9.805649E−04 | −9.930080E−04 | 3.579785E−04 | −3.830875E−05 | |
| 14 | −1.946181E−03 | −8.340211E−04 | 3.840539E−04 | −5.759435E−05 | |

TABLE 7-continued

| | | | | |
|---|---|---|---|---|
| 15 | −5.323561E−05 | −1.037728E−04 | 2.072086E−05 | −1.197252E−06 |
| 16 | −4.954813E−04 | 2.566847E−06 | 6.721659E−06 | −4.488939E−07 |

| | Aspheric Coefficient | | | | |
|---|---|---|---|---|---|
| Surf. No. Si | A12 | A13 | A14 | A15 | A16 |
| 5 | −4.474176E−10 | −3.407483E−11 | −2.168633E−11 | −9.308618E−13 | 4.683413E−13 |
| 6 | −3.691623E−10 | −1.881136E−11 | −2.807892E−11 | −2.665687E−12 | 5.245531E−13 |
| 13 | | | | | |
| 14 | | | | | |
| 15 | | | | | |
| 16 | | | | | |

| | Aspheric Coefficient | | | |
|---|---|---|---|---|
| Surf. No. Si | A17 | A18 | A19 | A20 |
| 5 | 1.438236E−14 | 3.634176E−15 | 1.071744E−15 | −2.717299E−16 |
| 6 | −7.786304E−15 | −4.004189E−15 | 1.148904E−14 | −1.482303E−15 |
| 13 | | | | |
| 14 | | | | |
| 15 | | | | |
| 16 | | | | |

(*Aspheric Surface)

TABLE 8

| Cond. Exp. No. | Formula in Inequation | Example 1 | Example 2 | Example 3 | Example 4 | Example 5 | Example 6 | Example 7 |
|---|---|---|---|---|---|---|---|---|
| (1) | fw/f13 + fw/f24 | −0.018 | 0.029 | −0.001 | −0.045 | −0.01 | −0.146 | 0.089 |
| (2) | fw/f13 + fw/f24 + fw/f31 | 0.213 | 0.245 | 0.225 | 0.19 | 0.228 | 0.091 | 0.303 |
| (3) | f1/fw | −2.657 | −2.511 | −2.608 | −2.706 | −2.775 | −2.707 | −2.608 |
| (4) | LT/(fw * U * tanω) | 2.029 | 2.031 | 2.033 | 2.017 | 1.997 | 2.022 | 2.031 |

What is claimed is:

1. A zoom lens substantially consisting of a first lens group having a negative power, a second lens group having a positive power, and a third lens group having a positive power arranged in this order from an object side and an aperture stop which is moved integrally with the second lens group, and performing zooming by changing a distance between the first and second lens groups and a distance between the second and third lens groups, wherein:
the first lens group is composed of a first group first lens having a negative power with a concave surface facing an image side, a first group second lens having a negative power with a concave surface facing the image side, and a first group third lens having a positive power and at least one aspheric surface with a convex surface facing the object side arranged in this order from the object side;
the second lens group is composed of a second group first lens having a positive power with a convex surface facing the object side, a cemented lens having a positive power as a whole, and a second group fourth lens having a negative power and at least one aspheric surface with a concave surface facing the image side arranged in this order from the object side, wherein the cemented lens is composed of a second group second lens having a positive power with a convex surface facing the object side and a second group third lens having a negative power with a concave surface facing the image side arranged in this order from the object side; and
the third lens group is composed of a third group first lens having a positive power.

2. The zoom lens of claim 1, wherein both the first group third lens and the second group fourth lens are plastic lenses and the zoom lens satisfies a conditional expression (1) given below:

$$-0.2 < fw/f13 + fw/f24 < 0.2 \qquad (1),$$

where: fw is a focal length of the entire zoom lens system at a wide angle end;
f13 is a focal length of the first group third lens; and
f24 is a focal length of the second group fourth lens.

3. The zoom lens of claim 2, wherein the zoom lens satisfies a conditional expression (3) given below:

$$-3.0 < f1/fw < -2.3 \qquad (3),$$

where f1 is a focal length of the first lens group.

4. The zoom lens of claim 2, wherein the zoom lens satisfies a conditional expression (4) given below:

$$1.8 < LT/(fw \times U \times \tan \omega) < 2.3 \qquad (4),$$

where: LT is an overall optical length;
U is a zoom ratio; and
ω is a half angle of view at a maximum image height at the wide angle end.

5. The zoom lens of claim 2, wherein focusing is performed by moving the third lens group.

6. The zoom lens of claim 2, wherein the zoom lens has a zoom ratio greater than 4× and less than 6×.

7. The zoom lens of claim 1, wherein the third group first lens is a plastic lens having at least one aspheric surface.

8. The zoom lens of claim 7, wherein the zoom lens satisfies a conditional expression (2) given below:

$$0 < fw/f13 + fw/f24 + fw/f31 < 0.4 \qquad (2),$$

where f31 is a focal length of the third group first lens.

9. The zoom lens of claim 8, wherein the second group fourth lens is a double-sided aspheric lens.

10. The zoom lens of claim 7, wherein the second group fourth lens is a double-sided aspheric lens.

11. The zoom lens of claim 7, wherein the zoom lens satisfies a conditional expression (3) given below:

$$-3.0<f1/fw<-2.3 \tag{3},$$

where f1 is a focal length of the first lens group.

12. The zoom lens of claim 7, wherein the zoom lens satisfies a conditional expression (4) given below:

$$1.8<LT/(fw \times U \times \tan \omega)2.3 \tag{4},$$

where: LT is an overall optical length;
U is a zoom ratio; and
ω is a half angle of view at a maximum image height at the wide angle end.

13. The zoom lens of claim 7, wherein focusing is performed by moving the third lens group.

14. The zoom lens of claim 1, wherein the zoom lens satisfies a conditional expression (3) given below:

$$-3.0<f1/fw<-2.3 \tag{3},$$

where f1 is a focal length of the first lens group.

15. The zoom lens of claim 14, wherein the zoom lens satisfies a conditional expression (3A) given below:

$$-2.8<f1/fw<-2.5 \tag{3A}.$$

16. The zoom lens of claim 1, wherein the zoom lens satisfies a conditional expression (4) given below:

$$1.8<LT/(fw \times U \times \tan \omega)<2.3 \tag{4},$$

where: LT is an overall optical length;
U is a zoom ratio; and
ω is a half angle of view at a maximum image height at the wide angle end.

17. The zoom lens of claim 16, wherein the zoom lens satisfies a conditional expression (4A) given below:

$$1.9<LT/(fw \times U \times \tan \omega)<2.1 \tag{4A}.$$

18. The zoom lens of claim 1, wherein focusing is performed by moving the third lens group.

19. The zoom lens of claim 1, wherein the zoom lens has a zoom ratio greater than 4× and less than 6×.

20. An image pickup apparatus, comprising the zoom lens of claim 1 and an image sensor for capturing an optical image formed by the zoom lens.

* * * * *